United States Patent [19]
Ishikawa

[11] Patent Number: 6,066,829
[45] Date of Patent: May 23, 2000

[54] APPARATUS FOR ENTERING, FORMATTING, AND STORING A VARIETY OF CHARACTERS, SYMBOLS, AND FIGURES FOR USE IN A LASER MARKING SYSTEM

[75] Inventor: Mitsuo Ishikawa, Chiba-ken, Japan

[73] Assignee: Miyachi Technos Corporation, Chiba-ken, Japan

[21] Appl. No.: 09/176,956

[22] Filed: Oct. 22, 1998

Related U.S. Application Data

[62] Division of application No. 08/885,952, Jun. 30, 1997, abandoned.

[30] Foreign Application Priority Data

Jul. 2, 1996 [JP] Japan .................................... 8-191590
Aug. 26, 1996 [JP] Japan .................................... 8-242690
Sep. 11, 1996 [JP] Japan .................................... 8-262437

[51] Int. Cl.$^7$ .................................................. B23K 26/00
[52] U.S. Cl. ..................................... 219/121.68; 347/225
[58] Field of Search ........................... 219/121.6, 121.68, 219/121.8, 121.85; 347/225; 364/474.08; 700/166

[56] References Cited

U.S. PATENT DOCUMENTS 5,329,090  7/1994  Woelki et al. ...................... 219/121.68
5,734,412  3/1998  Hasebe et al. .......................... 347/247

FOREIGN PATENT DOCUMENTS 0657850  6/1995  European Pat. Off. .
7-17194  1/1995  Japan .

Primary Examiner—Gregory Mills
Attorney, Agent, or Firm—Wenderoth, Lind & Ponack, L.L.P.

[57] ABSTRACT

A laser marker marks a workpiece surface with the pattern of a character, figure and/or symbol by laser beam scanning. It is desired to mark the pattern at the correct position on the workpiece surface. To facilitate the mark positioning, a virtual marking test is performed. In an embodiment, before the actual marking, a visible guide beam continuously and repeatedly scans the workpiece surface to form a projected image of the pattern or its domain. In another embodiment, before the actual marking, a visual display superimposes an image of the pattern and/or domain on a monitored image of the workpiece from a monitor camera. An automatic marking pattern generator is provided to automatically determine the character pattern to be marked from the entered character and marking area information.

9 Claims, 22 Drawing Sheets

| START NO. | DRAWING DATA | MARKING SPEED | Q-SWITCH FREQ (kHz) | LAMP CURRENT (A) | .... |
|---|---|---|---|---|---|
| 1 | $Dm_1$ | 50 | 2.0 | 10.0 | : |
| 2 | $Dm_2$ | 60 | 3.2 | 12.0 | : |
| 3 | $Dm_3$ | 50 | 3.0 | 20.0 | : |
| . | . | . | . | . | . |
| 10 | $Dm_{10}$ | 80 | 3.0 | 20.0 | : |

APPARATUS FOR ENTERING, FORMATTING, AND STORING A VARIETY OF CHARACTERS, SYMBOLS, AND FIGURES FOR USE IN A LASER MARKING SYSTEM

This is a divisional application of Ser. No. 08/885,952, filed Jun. 30, 1997, now abandoned.

BACKGROUND OF THE INVENTION

The present invention relates to a scanning-type laser marking apparatus which uses a laser beam spot to scan a surface of a workpiece to thereby mark a desired pattern.

In the scanning-type laser marking method, a highly focused laser beam is projected onto a workpiece. The laser beam is swung by a scan mirror so that a beam spot of the laser beam scans a surface of the workpiece. A point on the workpiece surface where the laser beam spot hits is vaporized or altered in color instantly by the laser beam energy. The laser beam scanning or drawing results in marking a desired pattern of a character, figure and/or symbol on the workpiece surface.

In general, the scanning-type laser marking apparatus comprises a laser oscillator which oscillates and outputs a laser beam, a scanning head which swings the laser beam from the laser oscillator for projection onto the workpiece and a control which controls the operation (laser oscillation and laser beam scanning) of the laser oscillator and the scanning head.

The scanning head is fixed with the laser beam outlet directed to a marking point on a work bench. A software scanning coordinate viewed from the apparatus is predetermined for the workbench. A workpiece is placed on a workbench so that a marking surface of the workpiece is directed to the laser outlet of the scanning head. By changing the position and direction of the workpiece on the workbench, the workpiece marking position where the pattern is to be formed can be adjusted.

In the scanning-type laser marking apparatus, the pattern to be marked on a workpiece has a position, extension and direction in the scanning coordinate system. Thus, the workpiece positioning involves adjusting the workpiece position in the X (horizontal), Y (vertical) and θ (rotation) directions. For adjustment of the marking position on the workpiece the prior art actually marks a desired pattern on a workpiece sample. An operator evaluates an error of the result (marking position) from the desired position and adjusts the workpiece position based on the evaluated error.

The prior method of workpiece positioning is done on a trial and error basis by performing actual marking operations. Thus, the prior art method not only wastes or consumes laser oscillator and workpiece samples but also requires extensive time and procedures for the workpiece positioning. Therefore, the prior art method has the problem of low productivity.

The laser marking method can use computer technology to prepare a large number of patterns which can be arbitrarily changed or edited and to simply select a desired pattern for marking. Conventional laser marking patterns include a character or character string indicative of a product name, corporation name, manufacturing number or the like.

To set the pattern of a character (character string) in the prior art scanning laser marking apparatus, a user not only enters, by key operation, the desired character (character string) but also enters various parameters defining the layout of the character (character string) pattern including layout direction of the character or character string (horizontal, vertical, horizontal curve, vertical curve), x-start point, y-start point, character (character string) height, character (character string) width, character pitch, etc., by specifying desired numeric data, respectively. The apparatus uses the entered parameters to determine the layout. Then the apparatus determines the pattern of the character (character string) with the layout and stores the pattern data into a memory.

The user can confirm the entered character pattern on a display screen. If a layout change is required, the parameter values may appropriately be changed. A plurality of character fonts may be provided to allow a user to select a desired font.

Setting the character pattern in the prior art, however, requires complicated decisions and operations on the part of the user. In particular, when determining a layout, a user must enter the desired character pattern and character spacing by numeric data of various parameters. Except for a highly skilled operator, the layout determining procedure takes excessive time and labor since the parameter values may be changed many times to get the desired layout.

SUMMARY OF THE INVENTION

With the above prior art problems in mind, an object of the invention is to provide a scanning-type laser marking apparatus with which it is easy, quick and accurate to adjust a marking position on a workpiece.

Another object of the invention is to provide a scanning-type laser marking apparatus with which it is easy to enter a desired character pattern without taking excessive time.

In accordance with an aspect of the invention, there is provided a scanning-type laser marking apparatus for marking a desired pattern of a character, symbol and/or figure on a surface of a workpiece, in which a laser beam for marking from a laser oscillator is projected onto the workpiece via a scan mirror, the scan mirror being swung by a scanning means in response to a scanning signal from a control in such a manner that a beam spot of the laser beam scans the surface of the workpiece to thereby mark the pattern. In this apparatus, a pattern projected image forming means operates prior to the marking to project a visible guide beam from a guide beam generating means onto the workpiece via the scan mirror, to swing the scan mirror by operation of the scanning means in response to the scanning control signal from the control, and to cause a beam spot of the guide beam to continuously and repeatedly scan the surface of the workpiece to thereby form a projected image of a pattern corresponding to the desired pattern.

With this arrangement, prior to the marking, the pattern projected image forming means performs a visible guide beam scan on a workpiece surface so as to continuously and repeatedly draw a pattern to be marked. Due to the after-image effect on the human eye, a still projected image of the pattern is formed on the workpiece surface. Thus, an operator can adjust the workpiece position so that the projected image of the pattern is placed at a desired marking position.

In accordance with another aspect of the invention, there are provided a marking area figure setting means for setting graphical representation of a marking area where the pattern is marked; and a marking area image forming means operative prior to the marking for projecting a visible guide beam from the guide beam generating means on the workpiece via the scan mirror, for swinging the scan mirror by operation of the scanning means and for causing a beam spot of the guide beam to continuously and repeatedly scan the surface of the workpiece to thereby form a projected image of the graphical representation of the marking area.

With this arrangement, prior to the marking, the marking area image forming means performs a visible guide beam scan on a workpiece surface so as to continuously and repeatedly draw a graphical representation of a marking area set by the marking area figure setting means. Due to the afterimage effect on the human eye, a still projected image of the pattern is formed on the workpiece surface. Thus, an operator can simply adjust the workpiece position so that the projected image of the graphical representation is placed at the desired marking position on the workpiece.

In accordance with another aspect of the invention, there are provided a marking area figure setting means for setting graphical representation of a marking area where the pattern is marked;

a monitor camera for taking an image of the workpiece;

a display means having a screen on which an image is displayed; and a monitor display control means operative prior to the marking for simultaneously displaying, on the screen of the display means, a monitored image from the monitor camera and an image of the graphical representation of the marking area from the marking area figure setting means in superimposition on the monitored image.

With this arrangement, a monitor screen simultaneously presents a monitored image of the workpiece and an image of the graphical representation of the marking area from the marking area setting means in superimposition on the monitored image. Thus, an operator can properly move the workpiece on a workbench while looking at the composite image displayed on the monitor screen. As the workpiece moves on the workbench, the workpiece image on the monitor screen correspondingly moves. On the monitor screen, the graphical representation of the marking area is fixed at a position corresponding to the drawing position. The operator can adjust the workpiece position on the workbench so that, on the monitor screen, the graphical representation of the marking area corresponds to the desired marking position on the workpiece in the monitor image. Using the graphical representation of the marking area as a fixed reference, quick and accurate positioning of the workpiece can be carried out.

In accordance with another aspect of the invention, there are provided a monitor camera for taking an image of the workpiece;

a display means having a screen on which an image is displayed; and a monitor display control means operative prior to the marking for simultaneously displaying, on the screen of the display means, a monitored image from the monitored camera and an image of the pattern in superimposition on the monitored image.

With this arrangement, the monitor screen simultaneously displays a monitored image of the workpiece and a desired marking pattern in superimposition on the monitored image. For workpiece positioning, an operator can properly move the workpiece on a workbench in any direction while looking at a composite image displayed on the monitor screen so that the graphical representation of the marking area corresponds to the desired marking position on the workpiece in the monitored image.

In accordance with still another aspect of the invention, there are provided a marking area figure setting means for setting a marking area;

a character input means for inputting a desired character or character string to be arranged in the marking area;

a character pattern determining means for determining a pattern of the input character or character string form the character input means with a desired layout in the marking area set by the marking area setting means; and a character pattern data storing means for storing character pattern data indicative of the pattern of the character or character string determined by the character pattern determining means.

With this arrangement, a user uses the marking area setting means to set a marking area, and uses the character input means to input the desired character or character string to be arranged in the marking area. Then the apparatus automatically determines by the character pattern determining means the character pattern based on the input marking area and the character or character string. With this arrangement, a desired character pattern can be set with simple input operation and in a short time.

BRIEF DESCRIPTION OF THE DRAWINGS

The above and other objects and advantages of the invention will become more apparent from the following description taken in conjunction with the accompanying drawings in which.

DETAILED DESCRIPTION OF PREFERRED EMBODIMENT

Figure 1:
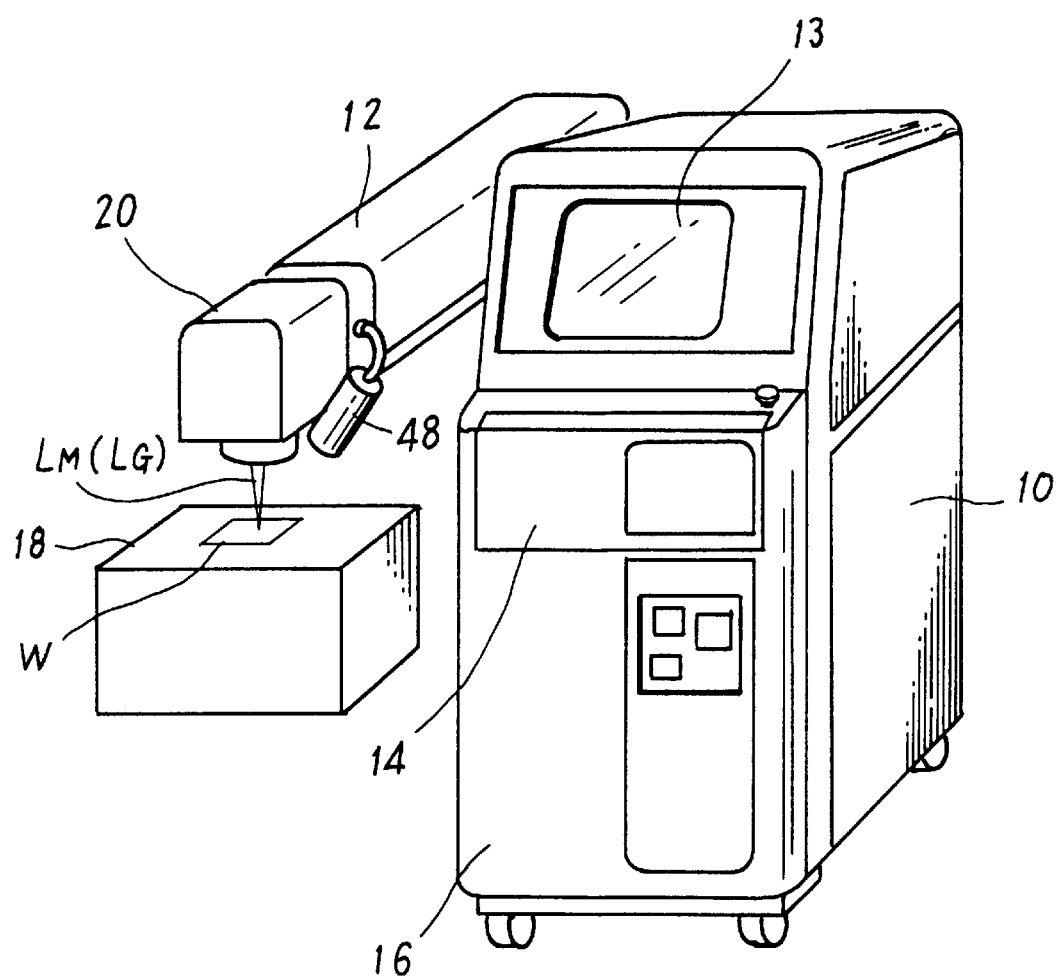
FIG. 1 is a perspective view of one embodiment of a scanning-type YAG laser marking apparatus.

FIG. 1 shows an external view of one embodiment of a scanning-type YAG laser marking apparatus. The YAG laser making apparatus comprises a control power supply unit 10, a laser oscillator unit 12 and a scanning head 20.

The control power supply unit 10 has an upper compartment in which a display 13 is housed, a middle compartment (back of the front panel 14) where a keyboard and a control board are housed and a lower compartment (back of the front panel 16) where a laser power supply circuit and a laser cooling apparatus are disposed. A control in the middle compartment generates and send a scanning control signal to the scanning head 20 via a signal line (not shown). Scanning head 20 is disposed at the laser outlet of the laser oscillator unit 12. A workbench 18 is disposed right under the scanning head 20. A workpiece W on the workbench 18 is marked by laser beam scanning. A monitor camera 48 that takes an image of the workpiece W on the workbench 18 is disposed on a supporting member near the scanning head 20.

Figure 2:
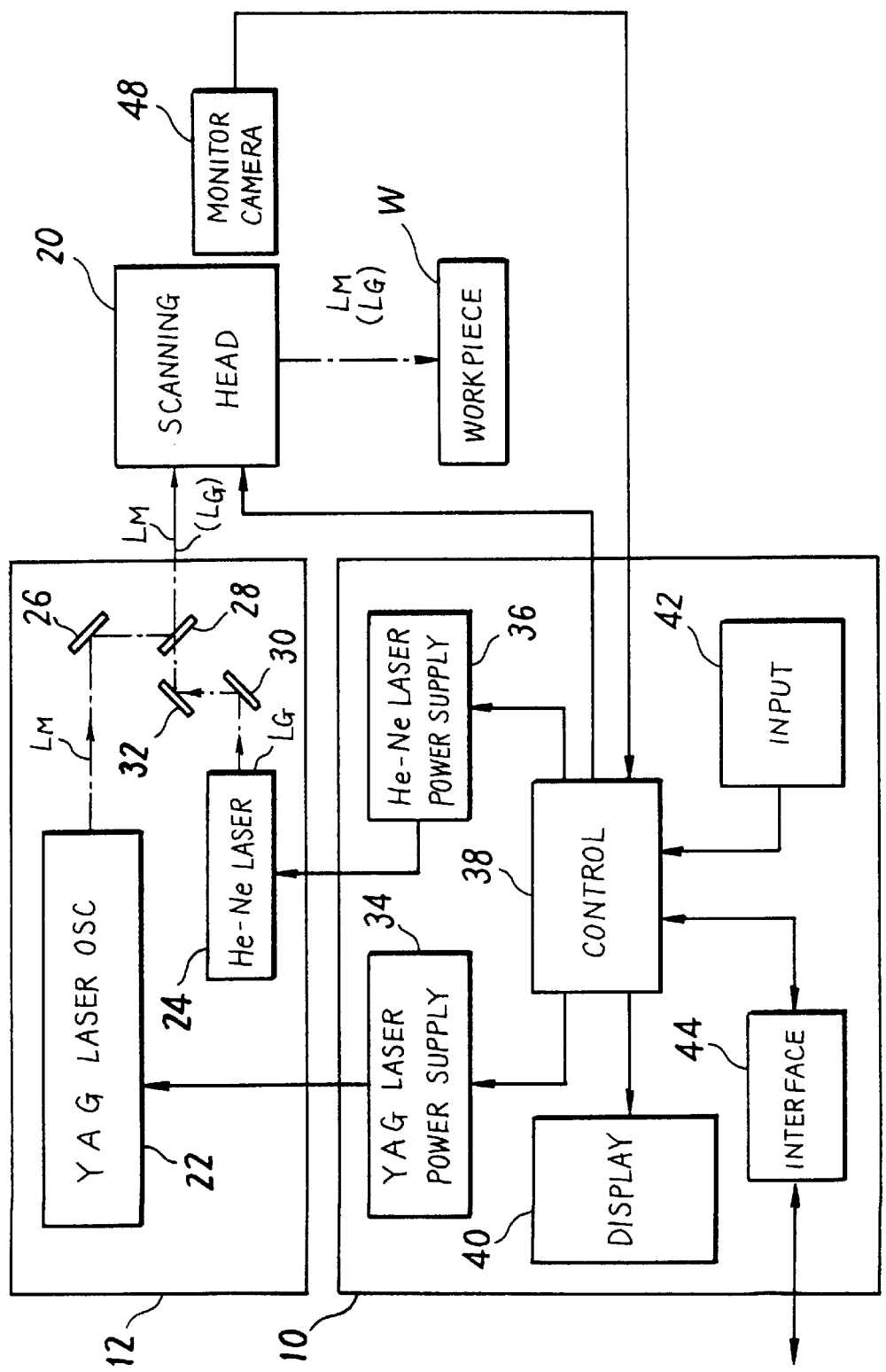
FIG. 2 is a block diagram showing an arrangement of a control power supply unit and laser oscillator unit of the embodiment.

FIG. 2 shows an arrangement of the control power supply unit 10 and the laser oscillator unit 12. The laser oscillator unit 12 comprises a YAG laser oscillator 22 for oscillating and outputting a marking YAG laser beam $L_M$ and a He-Ne laser 24 for generating a visible (e.g., red) guide beam $L_G$. The YAG laser beam $L_M$ emitted from the YAG laser oscillator 22 is bent at a right angle by a mirror 26, and is further bent at a right angle by a mirror 28 to the scanning head 20. The guide beam $L_G$ emitted from the He-Ne laser 24 is first bent at a right angle by a mirror 30, further bent at a right angle by a mirror 32 and transmitted through the mirror 28 to the scanning head 20.

The control power supply unit includes a YAG laser power supply 34, He-Ne laser power supply 36, control 38, display 40, input unit 42, interface circuit 44, etc. The YAG laser power supply 34 supplies electric power to a laser exciter (e.g., excitation lamp) in the YAG laser oscillator 22 under the control of the control 38. The He-Ne laser power supply 36 supplies electric power to a laser exciter (e.g., laser tube) in the He-Ne laser 24 under the control of the control 38.

The display 40 displays an image on the display screen 13 in response to image data and display control signal from the control 38. The input unit 42 includes input devices such as keyboard, mouse and image scanner. The interface circuit 44 communicates data and control signals with an external apparatus (not shown).

The control 38 comprises a microcomputer that processes data and controls the system components according to predetermined software stored in a memory. For instance, the control 38 supplies a scanning control signal to a scanning driver circuit in the scanning head 20 to control the scanning operation of the scanning head 20. A Q-switch is built in the YAG laser oscillator 22 to generate a pulsed laser beam with very high peak. The control 38 controls the Q-switch via control line (not shown). The control 38 includes an image memory, for instance, frame memory for temporarily storing a monitored image (motion image) from the monitor camera 48.

Figure 3:
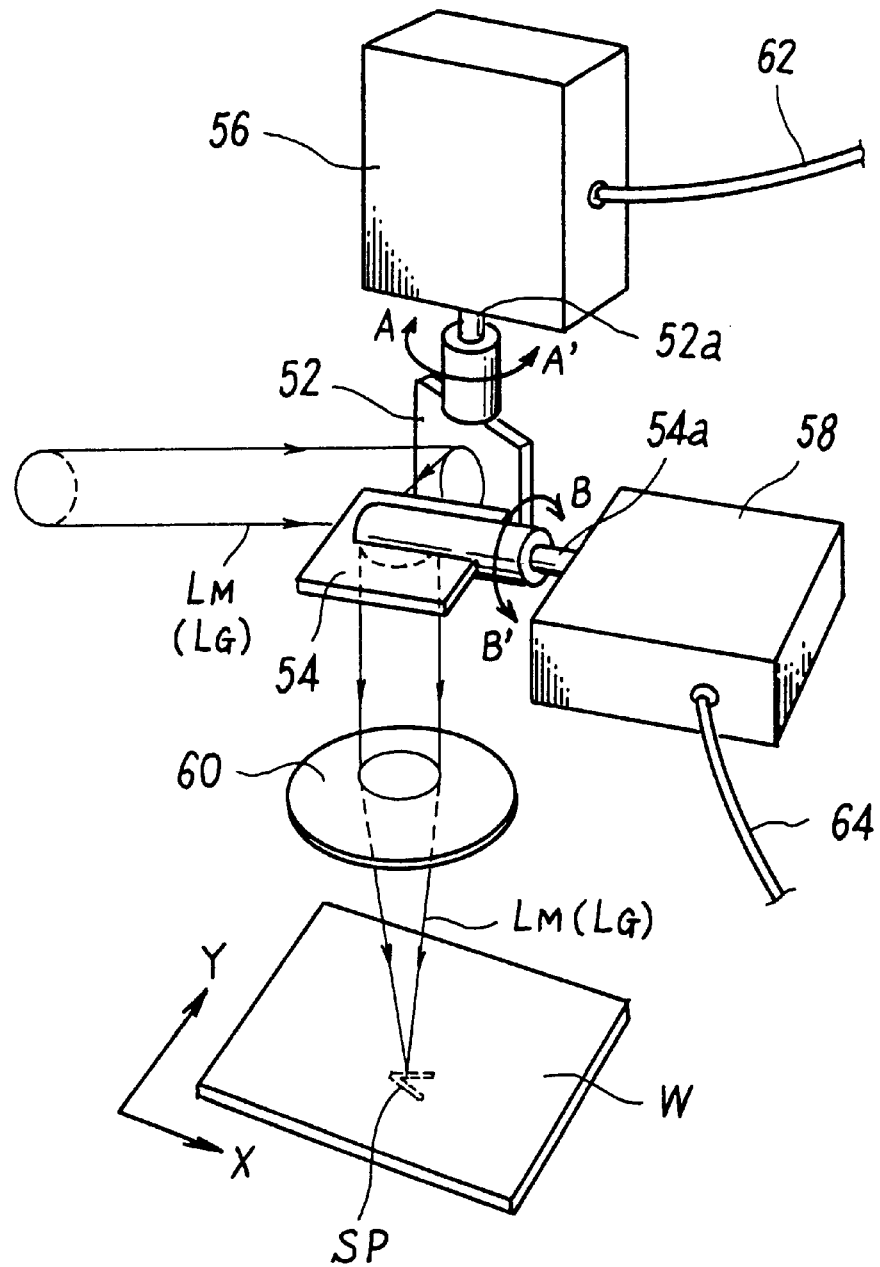
FIG. 3 is a view of a scanning mechanism in a scan head of the embodiment.

FIG. 3 shows a scanning mechanism in the scanning head 20. The scanning mechanism comprises an X axis scan mirror 52 and a Y axis scan mirror 54 attached to the rotating shafts 52a, 54a, crossing at a right angle, and an X axis galvanometer 56 and a Y axis galvanometer 58 for rotating or swinging the mirrors 52, 54.

The laser beam $L_M$ and/or guide beam $L_G$ from the laser oscillator unit 12 are/is projected onto the X axis scan mirror 52 in the scanning head 20. The X axis mirror 52 totally reflects them/it to the Y axis scan mirror 54 which totally reflects them/it onto a marking surface of the workpiece through an fθ lens 60 for condensing projection. The position of a beam spot SP on the marking surface is determined by the swing angle of the X axis scan mirror 52 for the X direction, and determined by the swing angle of the Y axis scan mirror 54 for the Y direction.

The X axis scan mirror 52 is driven by the X axis galvanometer 56 so as to rotate or swing in the direction of an arrow A, A'. The Y axis mirror 54 is driven by the Y axis galvanometer 58 so as to rotate or swing in the direction of an arrow B, B'.

The X axis galvanometer 56 comprises a movable iron core (rotor) coupled to the X axis scan mirror 52, a control spring connected to the movable iron core and a driver coil disposed on a stator. An X axis galvanometer driver circuit (not shown) supplies a driver current corresponding to the X-direction scanning control signal to the driver coil in the X axis galvanometer 56 via an electric cable 62 so that the moveable iron core (rotor) and the X axis scan mirror 52 integrally swing against the control spring to the angle specified by the X-direction scanning control signal.

The Y axis galvanometer 56 is similarly constructed. A Y axis galvanometer driver circuit (not shown) supplies a driving current corresponding to the Y-direction scanning control signal to the driver coil in the Y axis galvanometer 58 via an electric cable 64 so that the moveable iron core (rotor) in the Y axis galvanometer 58 and the Y axis scan mirror 54 integrally swing to the angle specified by the Y-direction scanning control signal.

The laser beam $L_M$ and/or guide beam $L_G$ from the laser oscillator unit 12 enter the scanning head 20 at appropriate timings. In synchronism, the galvanometers 56 and 58 respond to the X-direction and Y-direction scanning control signals to swing the X axis scan mirror 52 and the Y axis scan mirror 54 to a predetermined angle, respectively, so that a beam spot SP of the laser beam $L_M$ and/or guide beam $L_G$ scans a marking surface of the workpiece W.

Figures 4, 5:
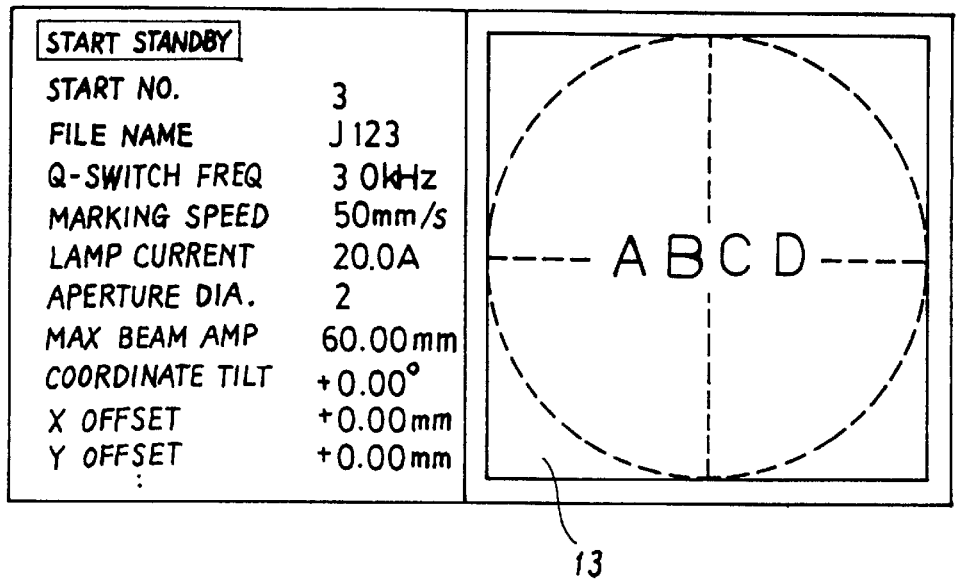
FIG. 4 is a view of a data setting screen displayed on a display in the control and power supply unit of the embodiment.
FIG. 5 is a table showing a data managing format of set data of the embodiment.

FIG. 4 illustrates a data setting screen displayed on the display 13 in the control and power supply unit 10. At the left of the screen, a present mode (start standby mode in FIG. 4) is displayed on top. Below the present mode display, a start number specifying a schedule of a marking operation is displayed. Below the start number, a pattern file name associated with the start number is displayed, as well as, condition data of the marking operation of the start number, including Q-switch frequency, marking speed, lamp current, aperture diameter, etc., are displayed in a list. At right of the screen, a still image MS ("ABCD") corresponding to the drawing data representative of the pattern of the start number is displayed on an X-Y coordinate. The illustrated character pattern of "ABCD" has been set in the character input mode as will be described. The right area of the display screen 13 may also be used to display a monitored image from the monitor camera 48.

A ROM in the control 38 stores data setting mode software for inputting and setting drawing data and condition data specifying a desired pattern for each start number, and marking execution mode software for executing a marking operation for each start number, etc. A RAM in the control 38 or in an external storage device stores the drawing data and the condition data set for each start number at predetermined locations, as illustrated in FIG. 5.

Further, software for the pattern projection mode, the marking area figure setting mode, the marking area figure projection mode, the composite image display mode, etc. and the data are respectively stored in ROM and RAM in the control 38. The control 38 further comprises a font memory used in the character input mode to be described.

In addition to the start standby mode shown in FIG. 4, the laser marking apparatus can operate in other main modes including a data setting mode, marking execution mode, marking area figure setting mode, marking area figure projection mode, composite image display mode, etc. The setting input mode is divided into submodes of a character input mode, figure input mode, condition data input mode, etc. The keyboard and/or mouse in the input unit 42 can be used to enter a command to select a desired main mode and/or submode.

Figure 6:
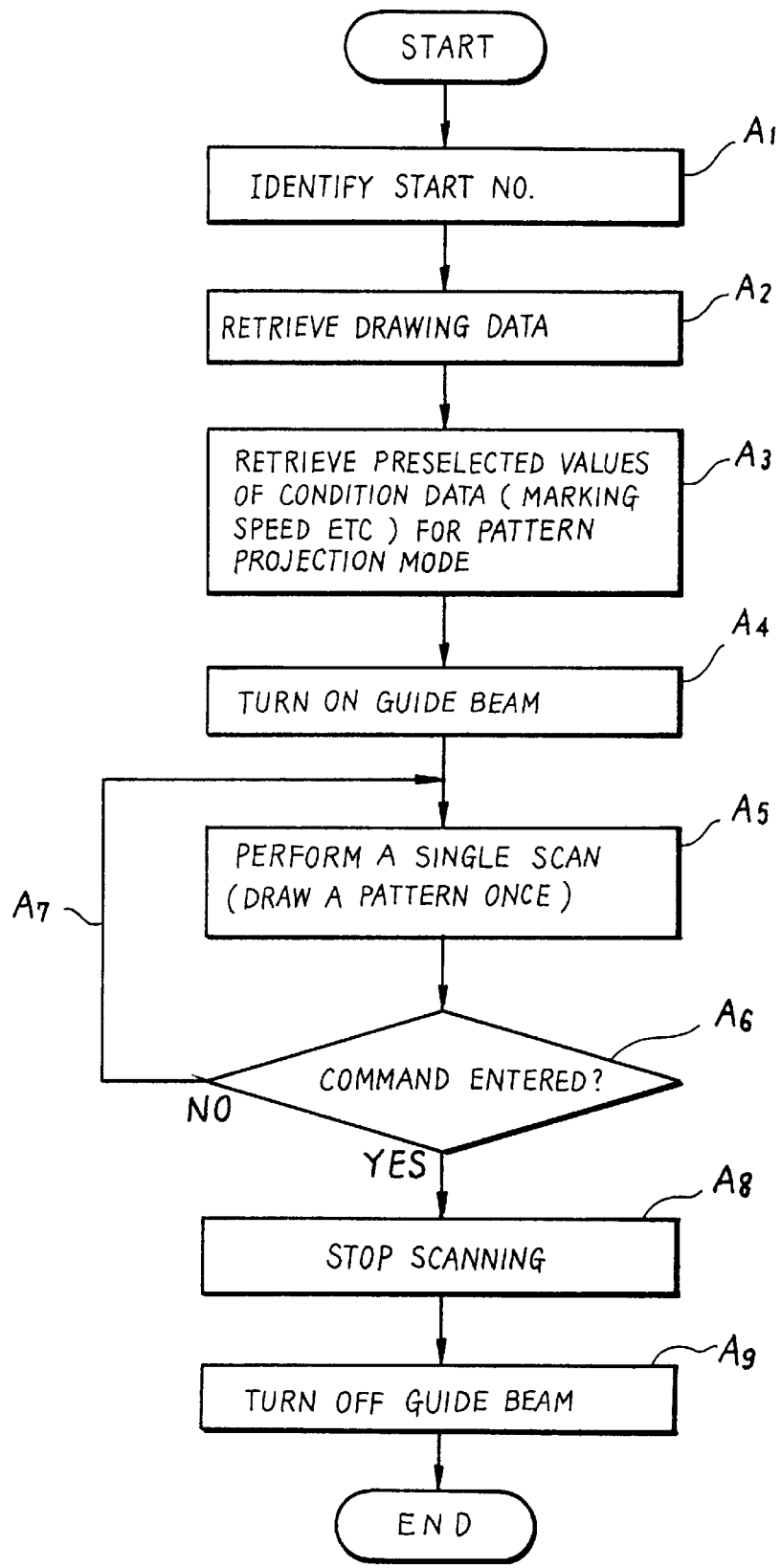
FIG. 6 is a flowchart showing an operation of the control of the embodiment for a pattern projection mode.

FIG. 6 is a flowchart showing an operation of the control for the pattern projection mode. When the laser marking apparatus has entered the patter projection mode from the condition shown in FIG. 4, the control 28 first identifies the start number (No. 3) presented on the display screen 13 (step A1) and then retrieves drawing data $D_m1$ (image data of "ABCD") of the start number (No. 3) from memory (step A2). However, the control 38 retrieves preselected values of condition data of marking speed (scanning speed) etc., for the pattern projection mode (step A3). The scanning speed for the pattern projection mode is normally set to be higher than the marking speed for marking process.

Next, the control 38 activates the He-Ne laser 24 via the He-Ne laser power supply 36, turning on the guide beam $L_G$ (step A4) whereas the YAG (laser) oscillator 22 is kept in the off state. Then, the control 38 supplies a scanning control signal corresponding to the retrieved drawing data and condition data to the scanning head 20 to perform a single scan of a beam spot SP of the guide beam $L_G$ on a workpiece W surface, thus drawing a pattern (characters of "ABCD") of the start number (No. 3) on the surface (step A5). The scanning operation continuously repeats until another command is entered (steps A5→A6→A7→A5). In repeating the scanning, a beam spot SP takes some time to return back to the pattern start point from the pattern end point. The returning time of the beam spot SP may be minimized by maximizing the scan mirror speed limit.

Repeatedly drawing a pattern (characters of "ABCD") using a visible (red) guide beam $L_G$ forms a still projected image of the pattern (characters of "ABCD") on surface of the workpiece W due to the afterimage effect on the human eye.

Then, an operator can position the workpiece W so that the projected image of the pattern (characters of "ABCD") is placed at the desired marking position on the workpiece W.

Figure 7:
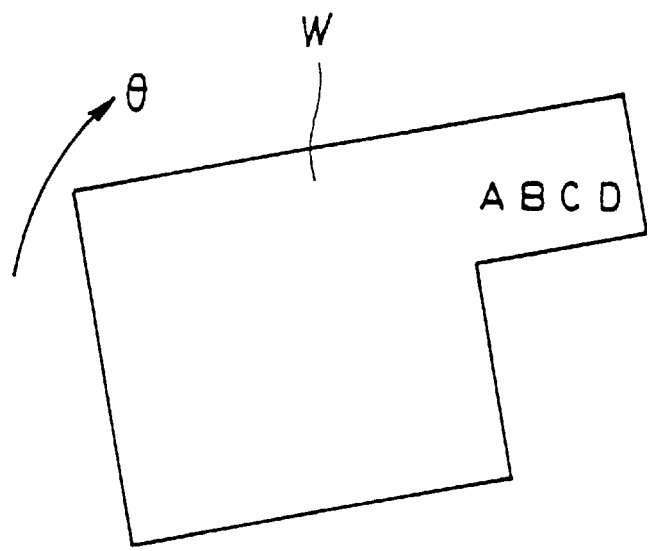
FIGS. 7(A)–7(C) illustrate workpiece positioning in the pattern projection mode of the embodiment.
Figure 7:
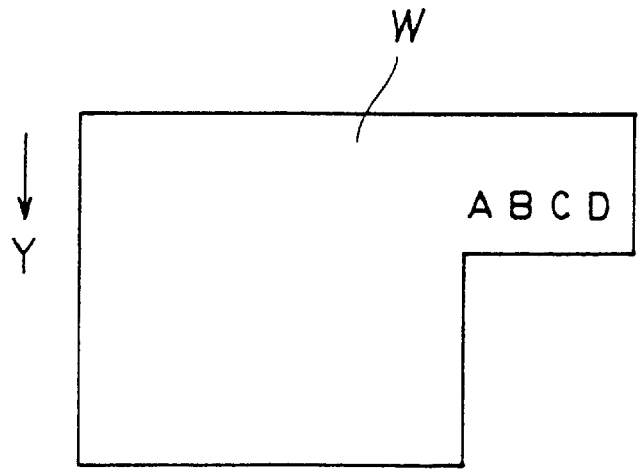
Figure 7:
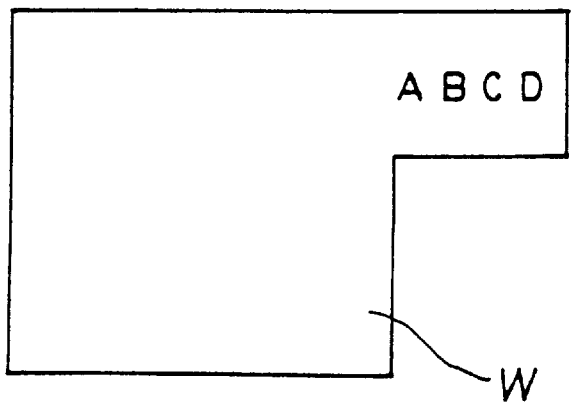

If the workpiece W is tilted relative to the projected image of the pattern (characters of "ABCD") as illustrated in FIG. 7(A), the workpiece W may first be rotated in the θ direction. After the rotation the workpiece W may still be out of position in the X and/or Y direction (FIG. 7(B)). Then, the workpiece W is shifted in the X and/or Y direction. During the workpiece positioning, the projected image of the pattern (characters of "ABCD") stands still so that the workpiece W positioning can quickly and accurately be done using the projected image of the pattern as reference.

After positioning the workpiece W in the pattern projection mode, the operator will input a command to enter the marking execution mode.

Figure 8:
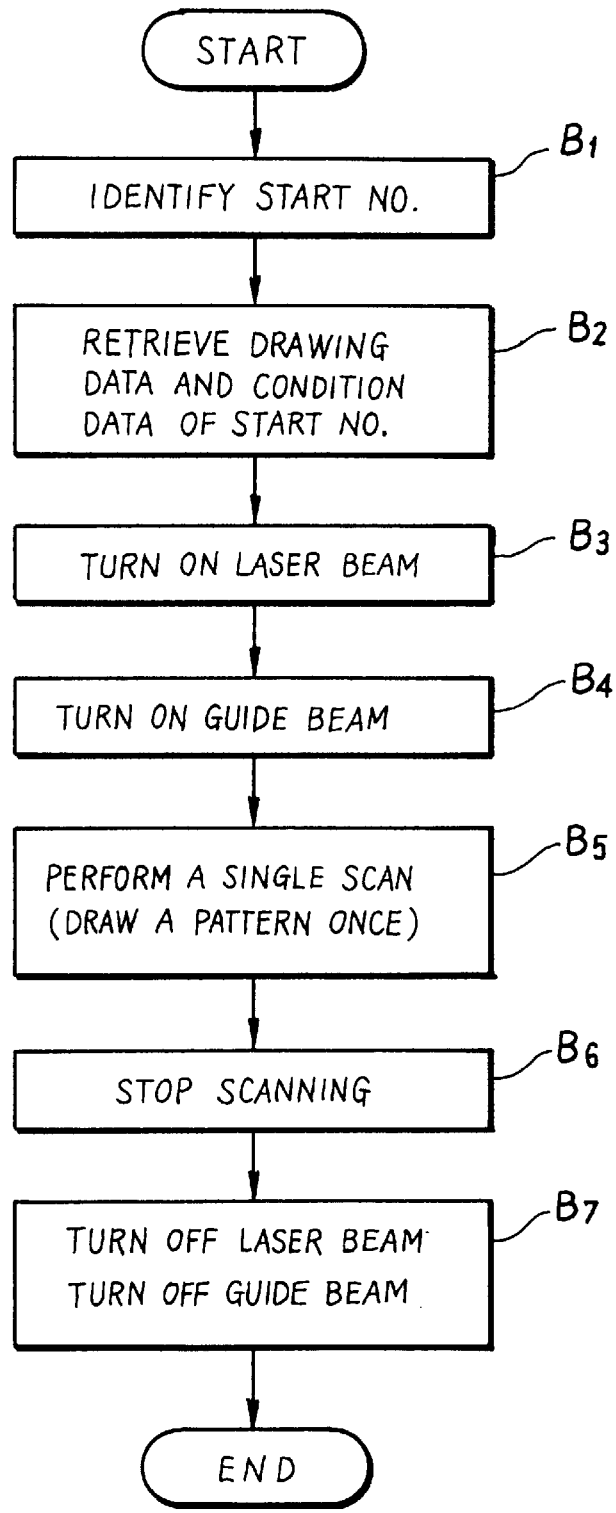
FIG. 8 is a flowchart showing an operation of the control of the embodiment for a marking execution mode.

FIG. 8 is a flowchart showing an operation of the control in the marking execution mode.

When entering the marking execution mode, the control 38 first identifies the start number (No. 3) presented on the display screen 13 (step B1). Then, the control 38 retrieves drawing data $D_m1$ (image data of "ABCD") and condition data (Q-switch frequency, scanning speed, etc.) of the start number (No. 3) from memory (step B2).

Next, the control 38 activates the YAG laser oscillator 22 and the He-Ne laser 24 via the YAG laser power supply 34 and the He-Ne laser power supply 36, thus turning on the YAG laser beam $L_M$ and the guide beam $L_G$. (steps B3 and B4). The control 38 supplies a scanning control signal corresponding to the retrieved drawing data and condition data to the scanning head 20 to perform a single scan of a beam spot SP of the YAG laser beam $L_M$ and the guide $L_G$ over a surface of the workpiece W, thus drawing a pattern (characters of "ABCD") of the start number (No. 3) on the workpiece W surface (step B5).

The scanning operation causes a point on a workpiece surface where the beam spot of the YAG laser beam $L_M$ hits is instantly vaporized or altered in color by the laser energy, so that the pattern (characters of "ABCD") is marked on the surface. Since the beam spot of the visible (red) guide beam $L_G$ draws the same pattern as that of the beam spot of the YAG laser beam $L_M$, the marking trace can be confirmed by eyes.

Normally, the marking process finishes by a single scan. Thus, after a single scan, the control 38 stops the scanning control signal (step B6) and turns off the YAG laser beam $L_M$ and the guide beam $L_G$ (step B7). When necessary, the scanning may repeat a number of times for the marking.

By the YAG laser beam $L_M$ scanning in the marking execution mode, a surface of the workpiece W is marked with the same pattern as that of the projected image at the desired position which has just previously been adjusted in the pattern projection mode as shown in FIG. 7(C).

In the prior art, the guide beam generating means (He-Ne laser 24) has been employed in the marking execution mode to allow a human (operator) to confirm the tracing of the marking by eye. In accordance with the invention, the guide beam generating means (He-Ne laser 24) is also used in the pattern projection mode to form an projected image of the pattern with the guide beam. Therefore, there is no need to add a new guide beam generator means for the pattern projection mode.

The YAG laser marking apparatus of the embodiment has employed a YAG laser oscillator as the marking laser oscillator means and a He-Ne laser as the guide beam generating means. These are illustrative only. The invention can employ any suitable marking laser oscillator means such as a $CO_2$ laser oscillator, semiconductor laser, etc., and any suitable guide beam generating means such as a semiconductor laser, light emitting diode, etc.

In accordance with the pattern projection mode of the invention, a projected image of a pattern similar to the marking pattern is formed prior to the laser marking process by continuous and repetitive scanning of the visible guide beam spot on a surface of a workpiece. Therefore, adjusting of the marking position on the workpiece can be done easily, quickly and accurately.

The description now turns to the marking area figure setting mode and the marking area figure projection mode of the embodiment with reference to FIGS. 9 to 14.

Figure 9:
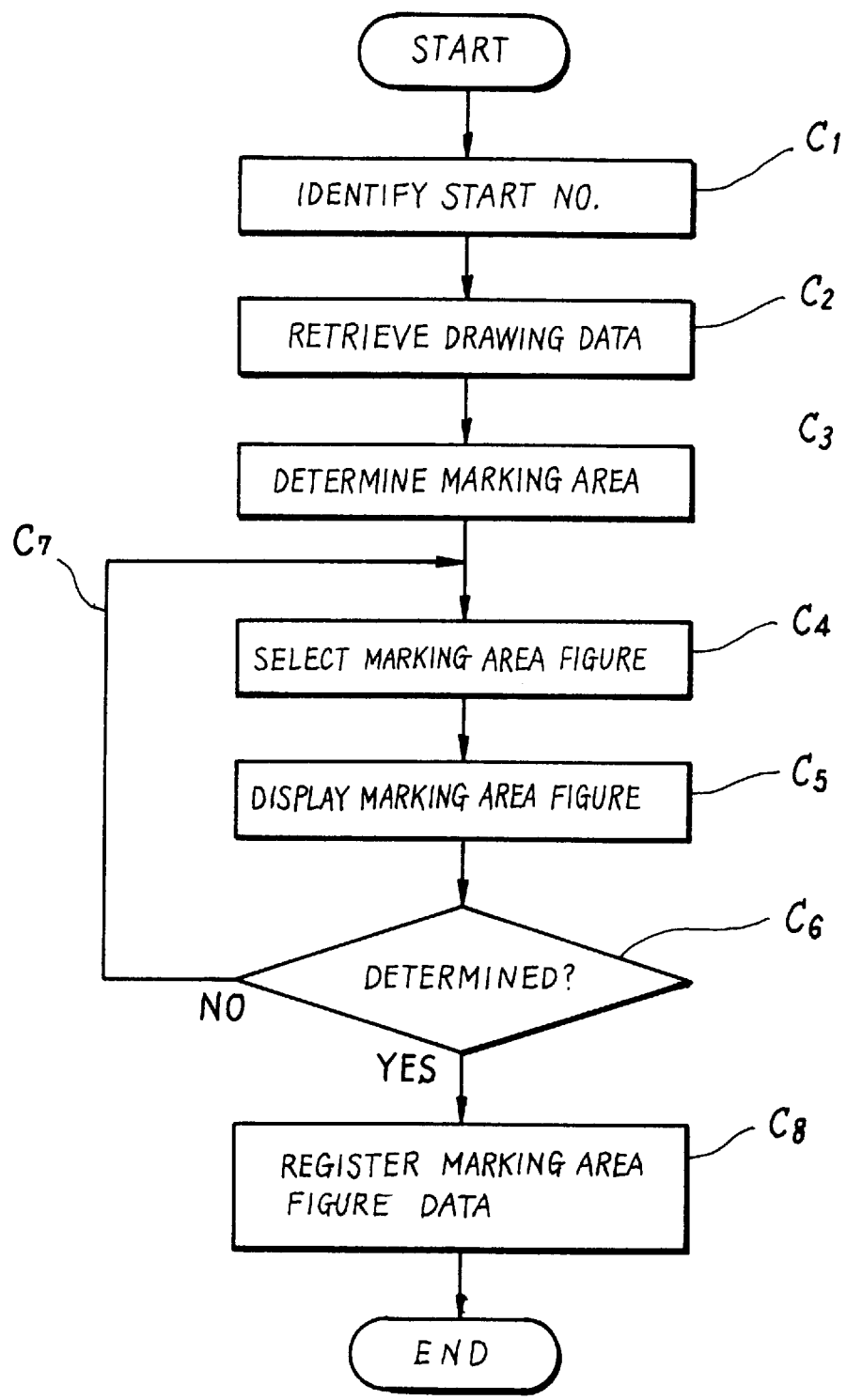
FIG. 9 is a flowchart showing an operation of the control of the embodiment for a marking area figure setting mode.
Figure 10:
FIGS. 10($a$)–10($d$) are diagrams illustrating the kinds of graphical representation of a marking area provided in the marking area figure setting mode of the embodiment.
Figure 10:
Figure 10:
Figure 10:

FIG. 9 is a flowchart showing the operation of the control 38 in the marking area figure setting mode.

When the laser marking apparatus has entered the marking area figure setting mode from the condition shown in FIG. 4, the control 38 identified the start number (No. 3) presently displayed on the screen 13 (step C1). Next, the control 38 retrieves the drawing data Dm3 (image data of "ABCD") of the start number (No. 3) from memory together with the position (coordinate) data specifying the drawing position (step C2).

Next, the control 38 uses the retrieved image data Dm3 and the position data to determine a marking area where the pattern ("ABCD") is marked (step C3).

Then, the control 38 receives a command from a user that designates one of the graphical representation types (a), (b), (c), (d) (here, four types of graphical representation examples) prepared in the system, as shown in FIGS. 10(a)–10(d) (step C4) and displays the designated graphical representation of the marking area ES together with the image MS of the pattern (ABCD) on the display screen 13 (step C5).

Figure 11:
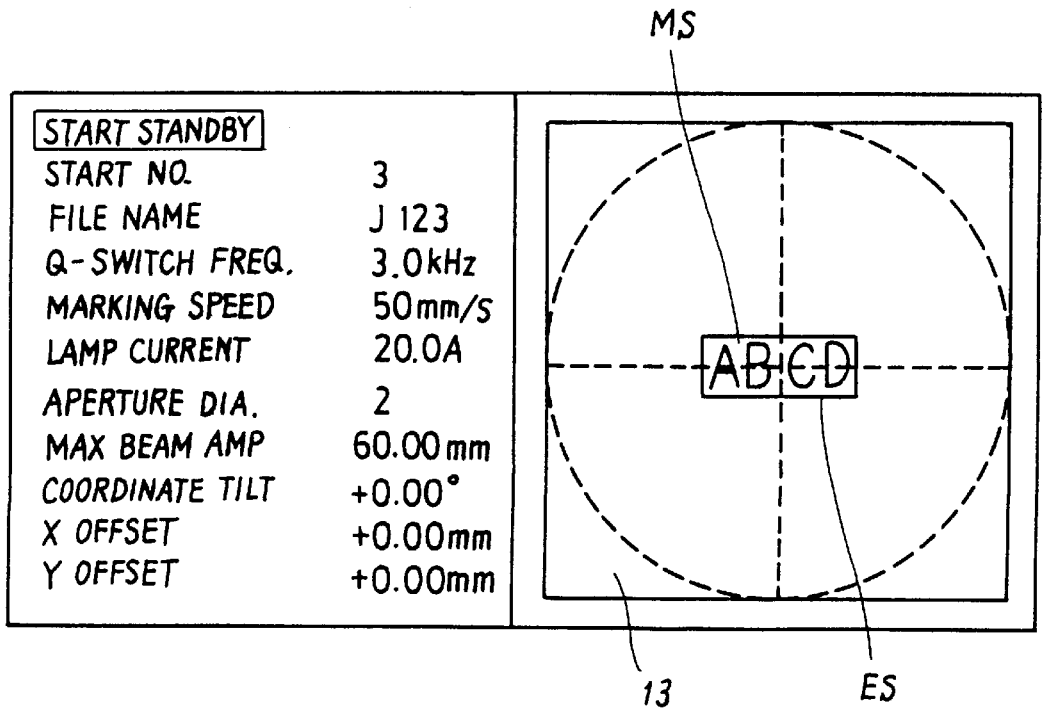
FIG. 11 is a view of a display screen presenting graphical representation of a marking area in the marking area figure setting mode of the embodiment.

When a user has selected the graphical representation (a) in the case of the start number (No. 3), the right area of the display screen 13 displays the image shown in FIG. 11. It is desirable to distinguish the marking area graphical representation ES from the pattern MS on the display screen, using different colors.

If the marking area graphical representation ES displayed on the screen 13 is not satisfactory, a user (operator) can change to another graphical representation, say, (d) (steps C6→C7→C4→C5). If a satisfactory marking area graphical representation ES is displayed on the screen, an acknowledge command may be entered (step C6). The control 38 registers the selected marking area graphical representation (step C8). The drawing data (image data and position data) of the registered marking area graphical representation may be stored into memory for the start number (No. 3) in the format of FIG. 5.

Any graphical representation of the marking area can be used insomuch as it graphically represents a marking area where the pattern is marked. For instance, a simple figure such as a parallelogram indicative of the outline of the marking area may be used for the marking area graphical representation, as shown in FIGS. 10(a)–(d). The illustrated pattern of "ABCD" is a simple character string. A marking pattern may be formed by plurality of character strings or complicated figures, or may include a filled portion. Even in such cases, the marking area graphical representation can be indicated with a simple figure that specifies the outline of the entire pattern.

As will be described, in accordance with the marking area figure projection mode of the embodiment, repetitive scanning of a visible guide beam $L_G$ on a surface of the workpiece W forms a projected image of the making area graphical representation. Since a simple figure is used for the marking area graphical representation, a single scan can finish in a short time so that a clear image of the marking area graphical representation can be formed.

Figure 12:
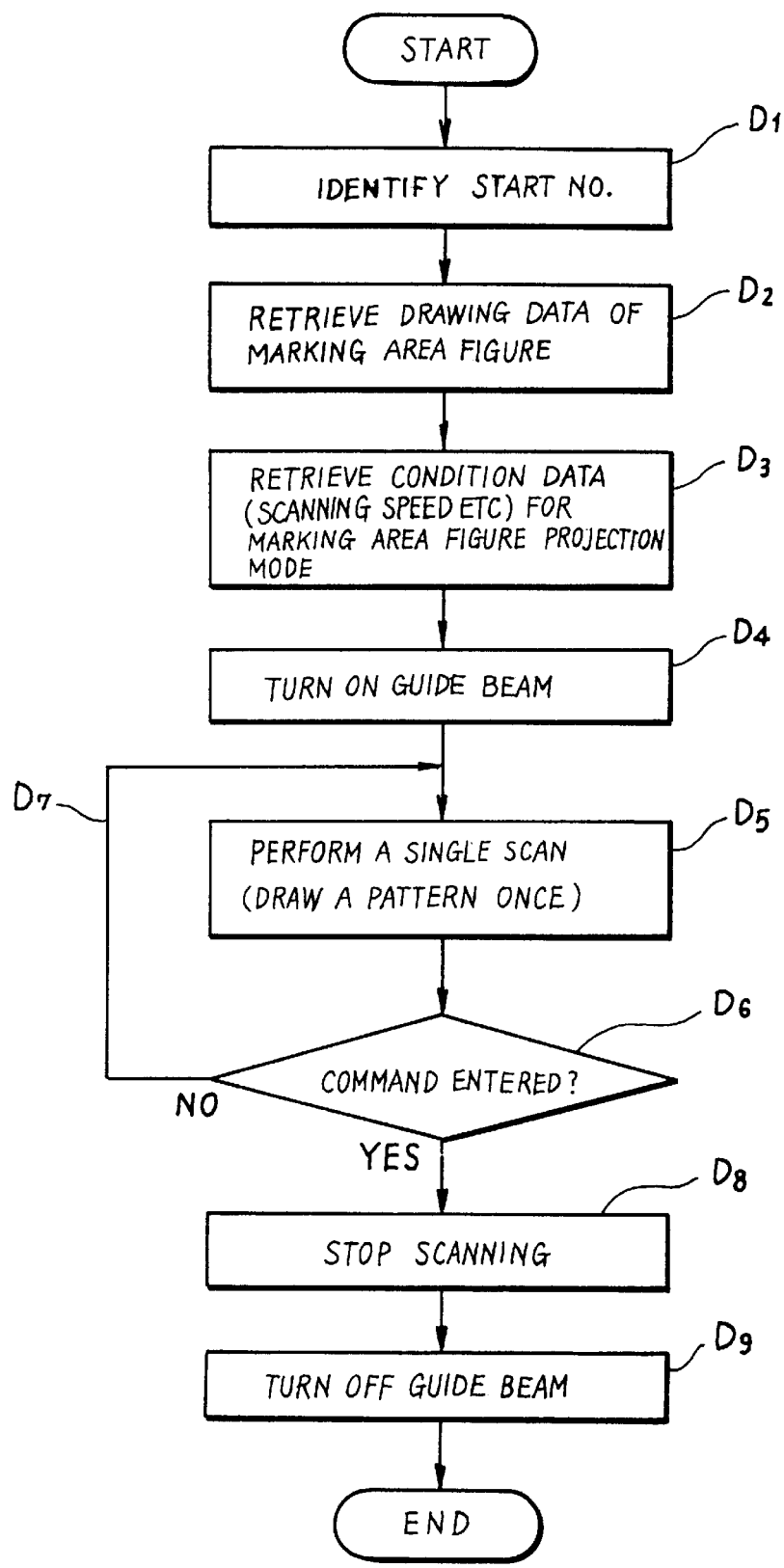
FIG. 12 is a flowchart showing an operation of the control of the embodiment for a marking area figure projection mode.
Figure 13:
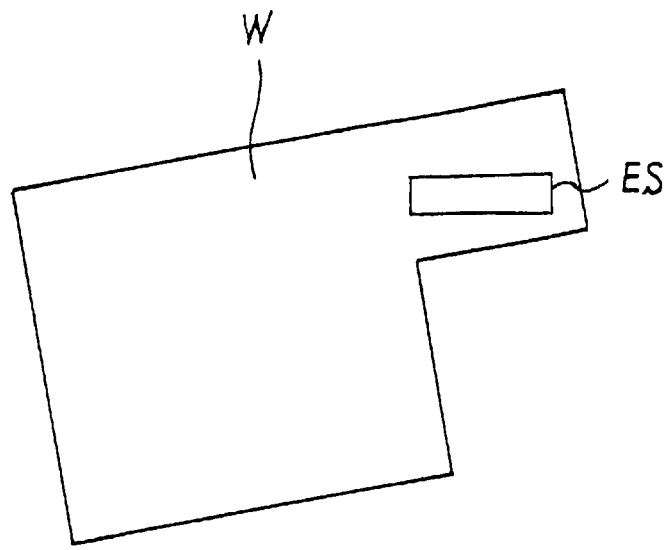
FIGS. 13(A)–13(B) illustrate workpiece positioning in the marking area figure projection mode of the embodiment.
Figure 13:
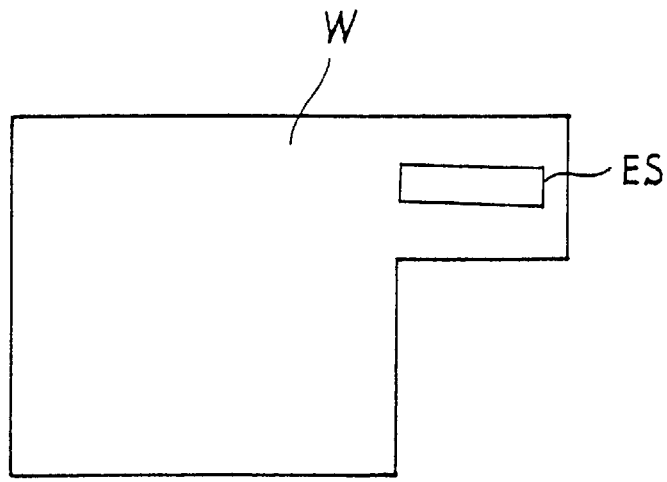
Figure 14:
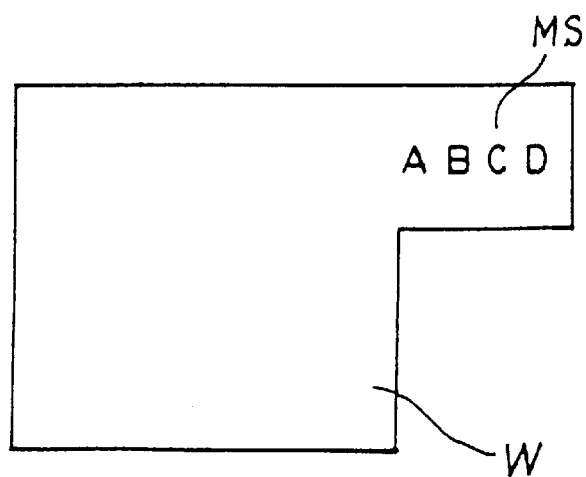
FIG. 14 illustrates a pattern marked on the workpiece in the marking execution mode of the embodiment.

FIG. 12 is a flowchart showing an operation of the control 38 in the marking area figure projection mode. When the laser marking apparatus has entered the marking area figure projection mode in the case of start number (No. 3), the control 38 first identifies the start number (No. 3) presently displayed on the screen 13 (step D1), and then retrieves the drawing data of the marking area graphical representation ES pertaining to the start number (No. 3) (step D2). The control 38 retrieves the condition data (scanning speed etc.) for the marking area figure projection mode from memory (step D3). The scanning speed of the marking area figure projection mode may normally be set to be higher than that of the marking process.

Next, the control 38 activates the He-Ne laser 24 via the He-Ne laser power supply 36, thus turning on the guide beam $L_G$ whereas the YAG laser oscillator 22 is kept in the off state (step D4). The control 38 supplies a scanning control signal corresponding to the marking area graphical representation ES drawing data and condition data to the scanning head 20 to perform a single scan of a beam spot SP of the guide beam $L_G$ on a surface of the workpiece W, thus drawing a marking area graphical representation ES of the marking pattern ("ABCD") of the start number (No. 3) on the surface (step D5). The scanning operation continuously repeats until a predetermined command is entered (steps D5→D6→D7→D5).

In repeating the scanning, a beam spot SP takes time to return back to the pattern start point from the end point. The returning time of the beam spot SP can be minimized by maximizing the speed of the scan mirror. Since the marking area graphical representation ES is a figure much simpler than that of the marking pattern, a single scan for drawing the marking area graphical representation can finish in a very short time.

The high speed, continuous and repetitive drawing of the marking area graphical representation ES using the visible (red) guide beam $L_G$ forms a still projected image of the marking area graphical representation ES on a surface of the workpiece W due to the afterimage effect on the human eye.

Then, an operator can adjust the position of the workpiece W so that the projected image of the marking area graphical representation ES corresponds to the desired marking position on the workpiece W.

When the workpiece W is out of position relative to the projected image of the marking graphical representation ES as shown in FIG. 13(A). The workpiece W may be rotated in the direction of θ and/or shifted along the X and/or Y direction so that the marking area graphical representation ES corresponds to the desired marking position on the workpiece W (FIG. 13(B)). Since the projected image of the marking area graphical representation ES stands still, the workpiece position can be adjusted quickly and accurately, using the projected image as a reference.

After positioning the workpiece W in the marking area graphical representation projection mode, the operator may enter a command to, for example, execute marking. Then the control 38 stops the scanning control signal (step D8), turns off the guide beam $L_G$ (step D9), terminates the marking area graphical representation projection mode and enters the marking execution mode.

The control 38 executes the marking as described (FIG. 8). A point on a workpiece W surface where a beam spot of the YAG laser beam $L_M$ hits is instantly vaporized or altered in color. As a result, the pattern MS of "ABCD" is marked. Since a beam spot of the visible (red) guide beam $L_G$ draws the same pattern as the invisible (infrared) YAG laser beam $L_M$, the operator can confirm the trace of the marking by eye.

The monitor camera 48 may be used to monitor the marking process of the workpiece W on the workbench 18. The monitored image (motion image) may be displayed on the screen 13. Since the monitor camera 48 provides a magnified image of the marking pattern, the monitored image is convenient for an operator to observe the making process, in particular in the case of a smaller size of workpiece W or marking pattern P. A protective eye cover may be provided for shielding an operator, from the scanning head 20 for marking the workpiece W for protecting the eyes against directly observing the workpiece W. Even in that case, the monitored image may conveniently be used.

The YAG laser beam $L_M$ scanning in the marking execution mode marks a desired pattern of ("ABCD") on a workpiece surface at the desired position which has just been adjusted in the marking area figure projection mode.

The description now turns to the composite image display mode of the embodiment with reference to FIGS. 15 to 20. The composite image display mode may be substituted for the marking area figure projection mode. Specifically, the composite image display mode can be used to adjust the position of the workpiece W on the workbench 18 before executing the marking. In particular, in the case when the workpiece W or the marking pattern is small or when a protective eye cover is provided near the scanning head 20, the composite image display mode may be selected, using a monitored image from the monitor camera 48.

The composite image display mode has two submodes of a first composite image display mode in which a marking area graphical representation superimposes on the monitored image from the monitor camera 48 and a second composite image display mode in which a marking pattern superimposes on the monitored image.

Figure 15:
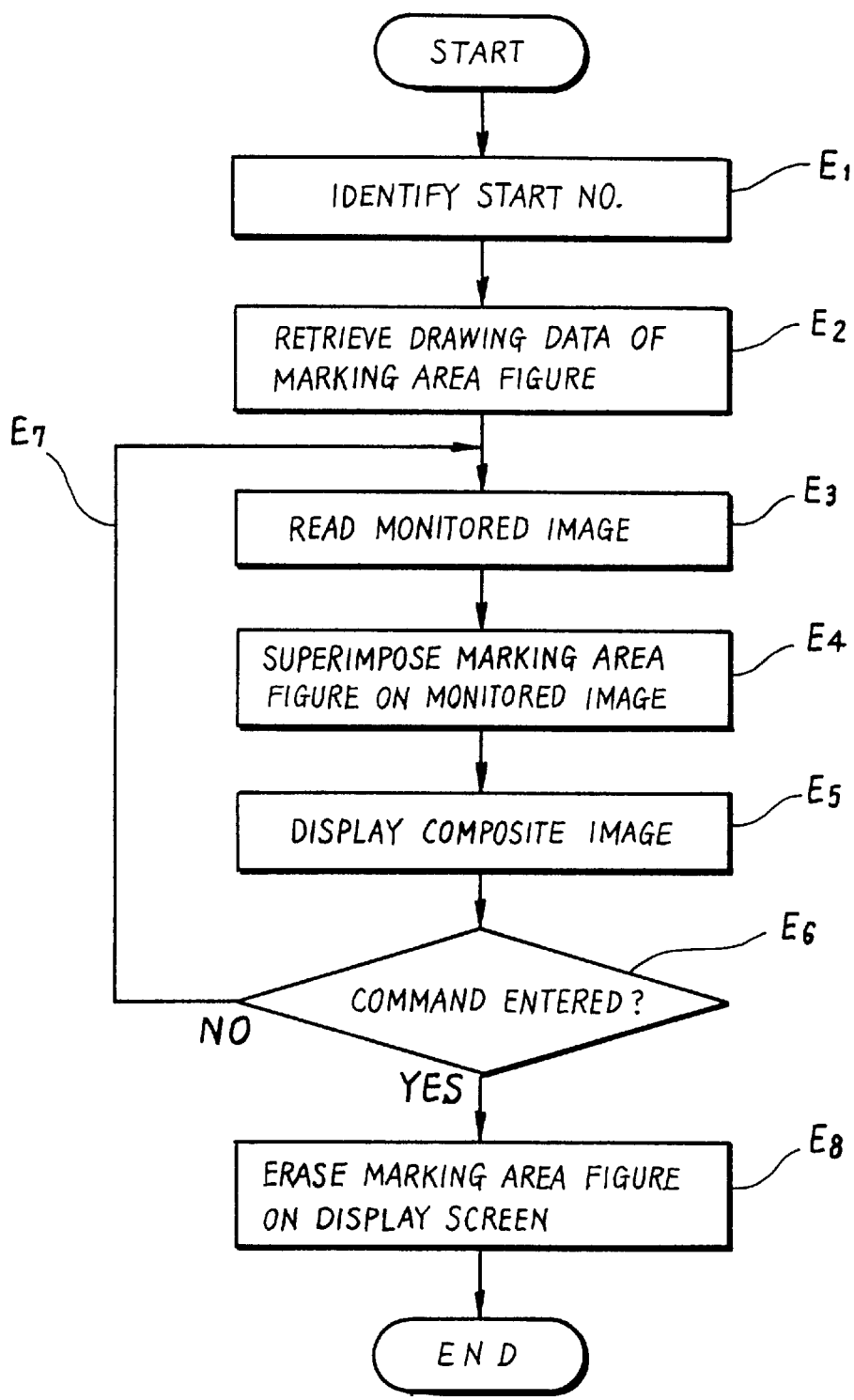
FIG. 15 is a flowchart showing an operation of the control of the embodiment for a first composite image display mode.

FIG. 15 is a flowchart showing an operation of the control 38 in the first composite image display mode. When entering the first composite image display mode, the control 38 identifies the selected start number (step E1) and retrieves the drawing data of marking area graphical representation preselected in the marking area figure setting mode for the start number (step E2). Then, the control 38 reads a monitored image from the monitor camera 48 into a frame memory (step E3) and writes the retrieved drawing data of the marking area graphic representation into the frame memory to superimpose it on the monitored image in the frame memory (step E4). The control 38 displays the composite image on the screen 13 (step E5). The composite image display continues until a predetermined command is entered (steps E5→E6→E7→E3→E4→E5).

Figure 16:
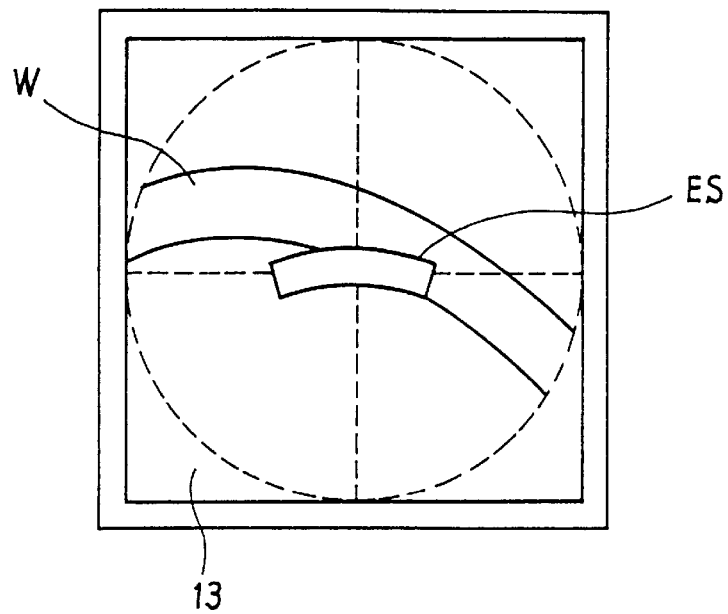
FIG. 16 illustrates a composite image (before positioning) displayed on the display screen in the first composite image display mode of the embodiment.
Figure 17:
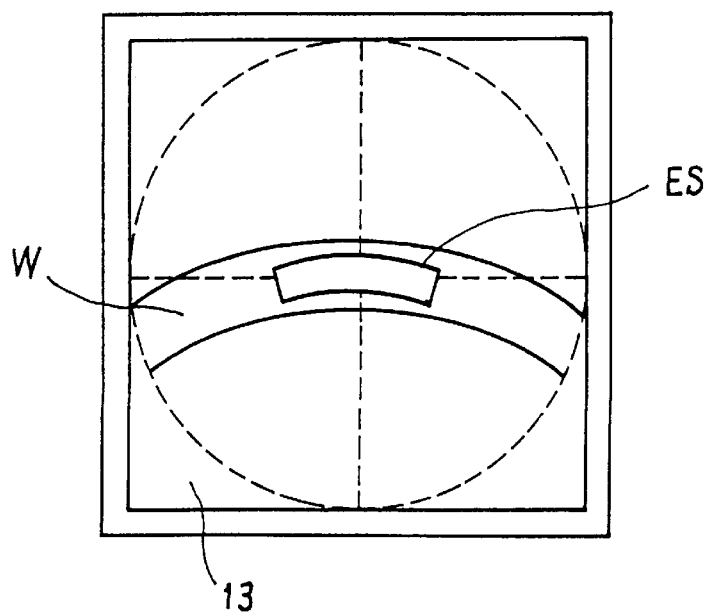
FIG. 17 illustrates a composite image (after positioning) displayed on the display screen in the first composite image display mode of the embodiment.

The display 13 simultaneously displays a monitored image of the workpiece W on the workbench 18 and the marking area graphical representation Es of the marking pattern ("ABCD") of the start number in superimposition on the monitored image, as shown in FIG. 16. Then, the operator may move the workpiece W on the workbench 18 properly in the X, Y and θ directions while observing the composite image displayed on the screen 13. As the workpiece W is moved on the bench 18, it is moved on the display screen 13 whereas the marking area graphical representation ES stands still at the display position corresponding to the drawing position.

The operator adjusts the position of the workpiece W on the workbench 18 so that, on the display screen 13, the marking area graphical representation ES corresponds to the desired marking position on the workpiece in the monitored image. As is the case with the marking area figure projection mode, the first composite image display mode makes it possible to provide quick and accurate positioning of the workpiece W using the still marking area graphical representation ES as a reference.

Figure 18:
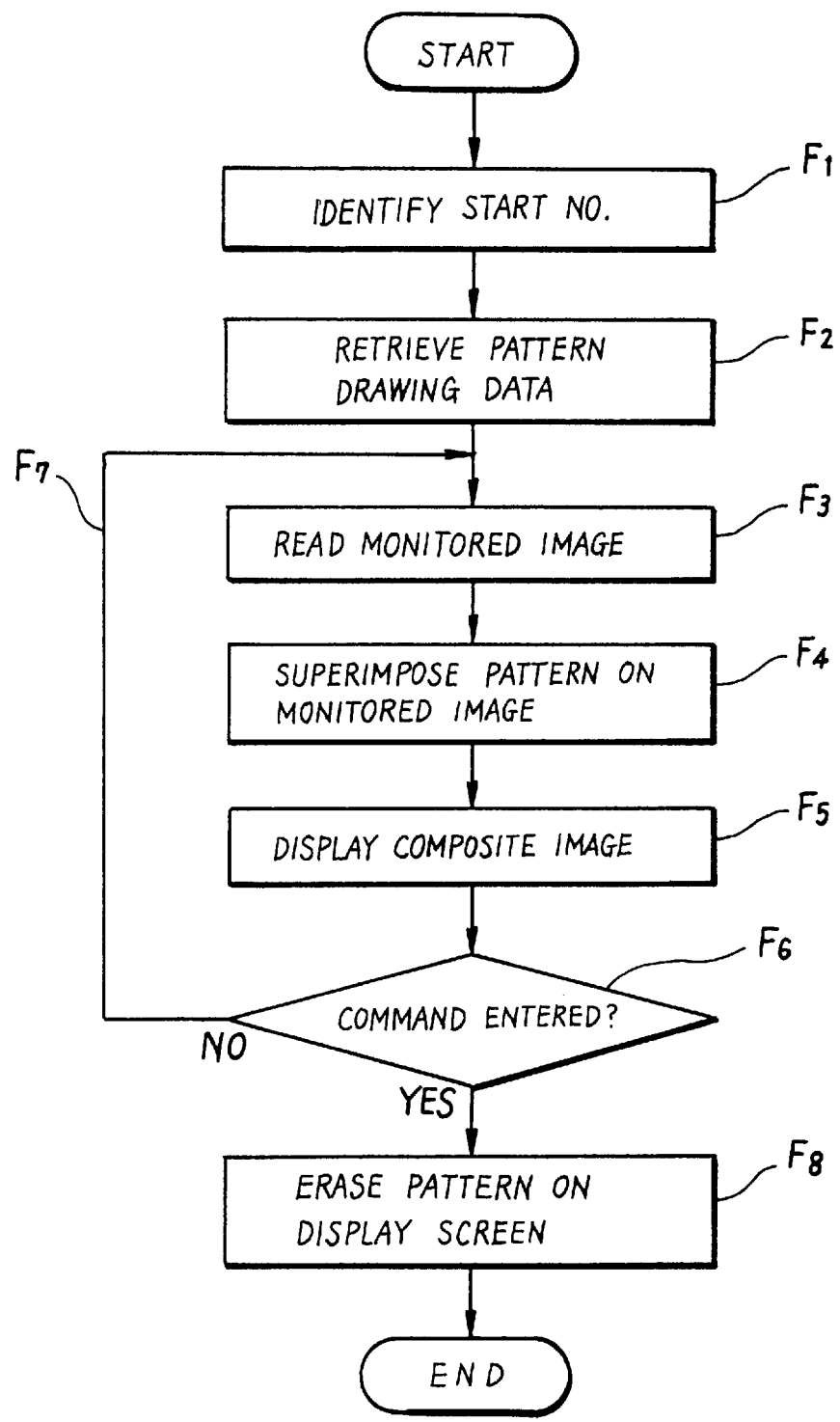
FIG. 18 is a flowchart showing an operation of the control of the embodiment for a second composite image display mode of the embodiment.
Figure 19:
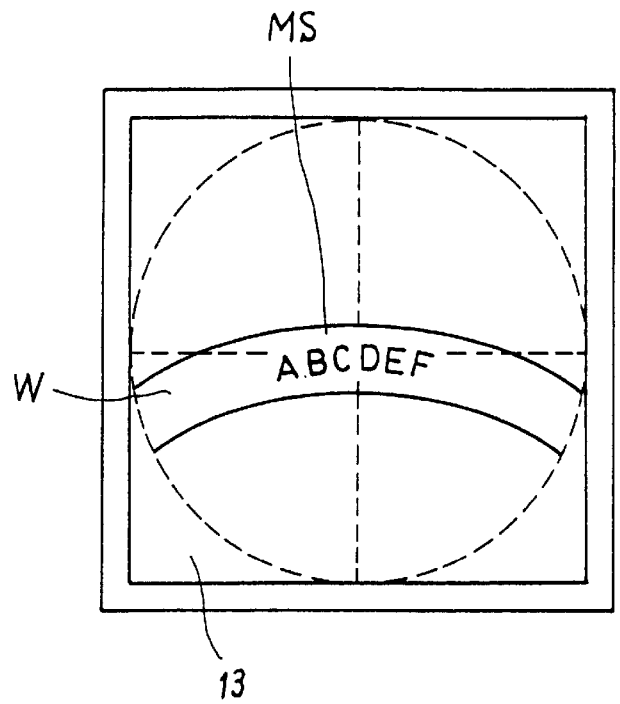
FIG. 19 illustrates a composite image (after positioning) displayed on the display screen in the second composite image display mode of the embodiment.

FIG. 18 is a flowchart showing an operation of the control 38 in the second composite image display mode. The second composite image display mode displays the marking pattern MS ("ABCDEF") in place of the graphical representation ES of the marking area on the display screen 13, as shown in FIG. 19. With the second composite image display mode, the operator can adjust the position of workpiece on the workbench 18 so that, on the display screen, the pattern MS ("ABCDEF") corresponds to the desired marking position on the workpiece W. The second composite image display can be carried out without setting the graphical representation of the marking area.

Figure 20:
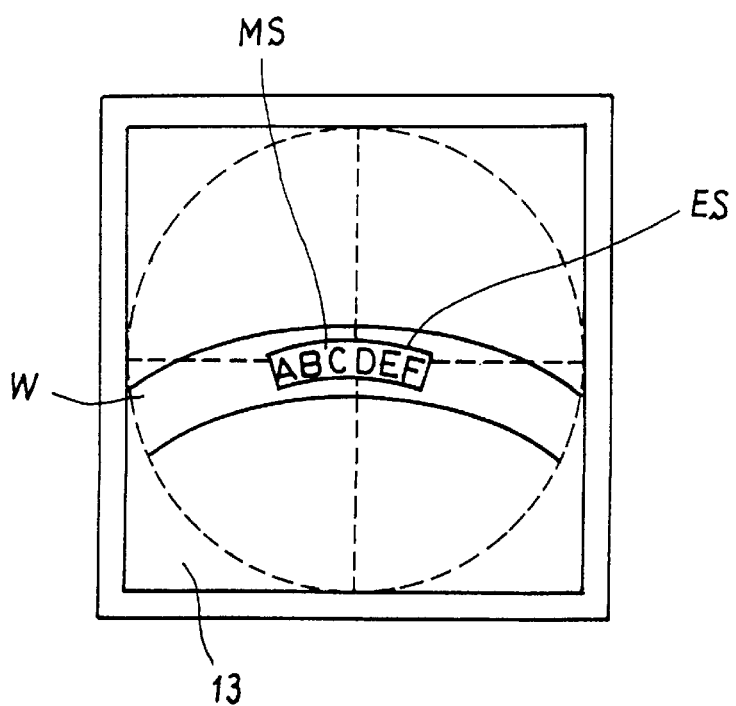
FIG. 20 illustrates a composite image (after positioning) displayed on the display screen in a modified mode of the third composite image display mode.

FIG. 20 is a view of the display screen 13 displayed in a modified mode of third composite image display. The third composite image display mode displays both the graphical representation ES of marking area and the pattern MS in superimposition on the monitored image from the monitor camera 48.

In the embodiment, the graphical representation of the marking area has been determined and stored in the marking area figure setting mode and is retrieved in the marking area figure projection mode, the first composite image display mode or the second composite image display mode. The marking area figure setting mode may be omitted, however. The graphical representation of the marking area may be determined from the selected pattern image and position data when necessary in the marking area figure projection mode, etc. In the embodiment, the workpiece W is moved to adjust the marking position on the workpiece W. The scanning head 20 may be moved instead.

Figure 21:
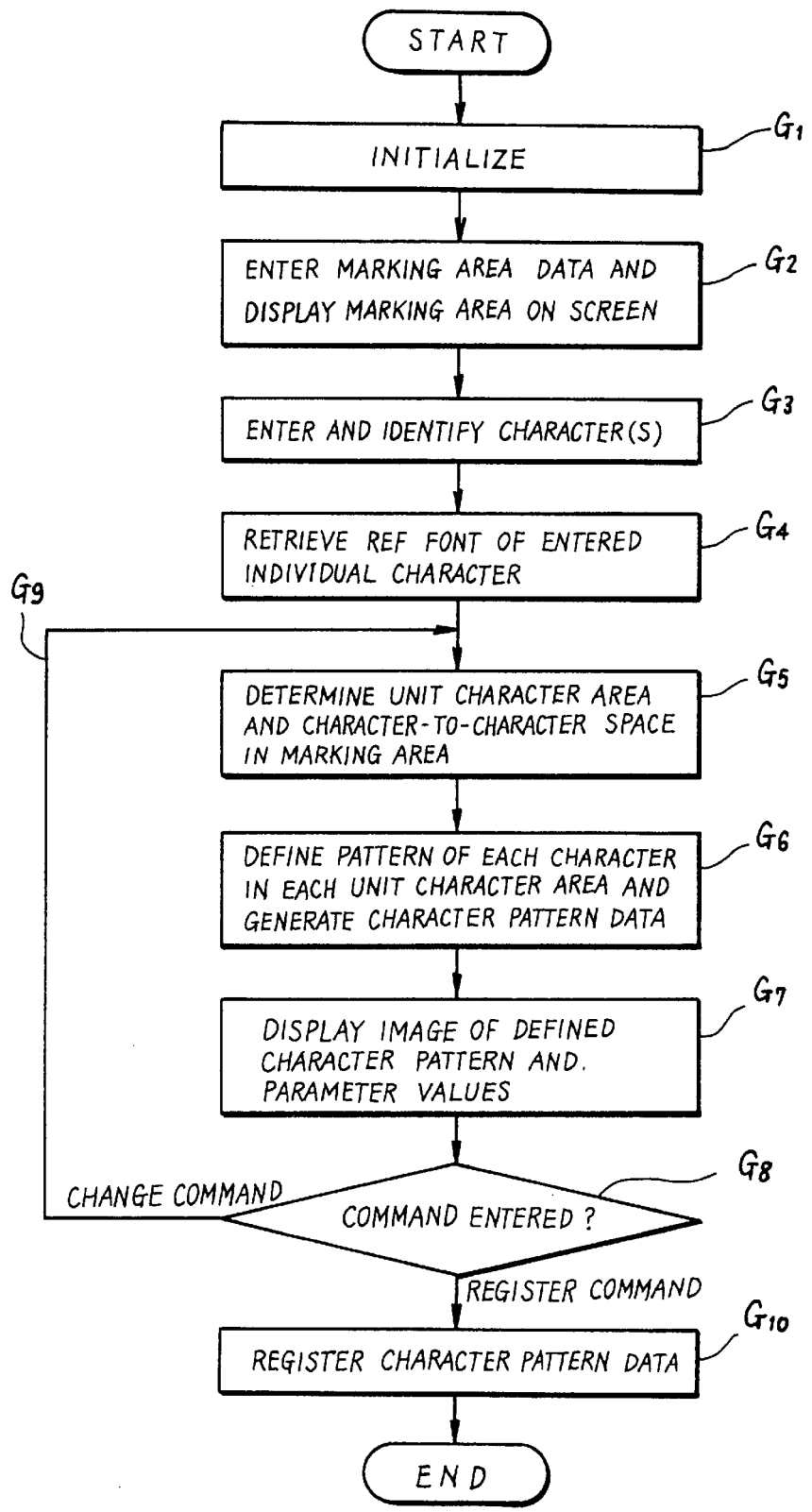
FIG. 21 is a flowchart showing an operation of the control of the embodiment for a character input mode.

The description now turns to the character input mode of the embodiment by reference to FIGS. 21 to 32. FIG. 21 is a flowchart showing an operation of the control 38 in the character input mode. Let us take, as an example, a character pattern ("ABCD") of the start No. 3 to describe the character input mode operation by reference to FIGS. 22 to 30.

Figure 22:
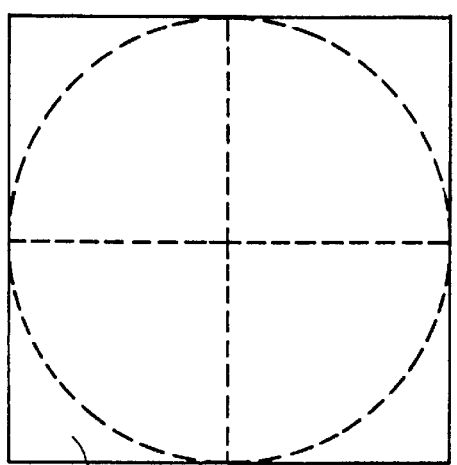
FIG. 22 illustrates an initial screen in the character input mode of the embodiment.
Figure 23:
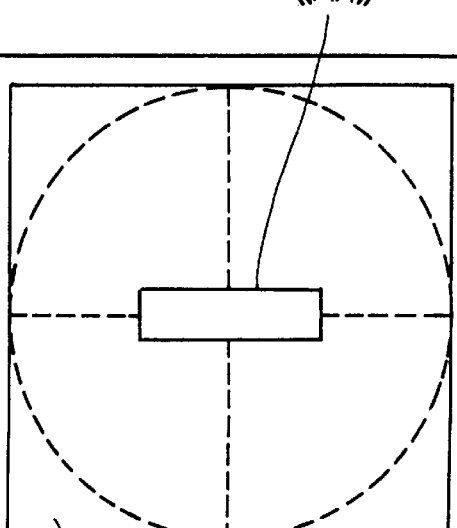
FIG. 23 illustrates a screen obtained in the character input mode of the embodiment when a marking area has been input and displayed.

When entering the character input mode, the control 38 initialized the system (step G1) and displays the initial screen of character input on the display screen 13, as shown in FIG. 22. The left area of the screen includes a file name field, in which a file name of the character pattern is entered, a direction field in which a layout direction of character string (horizontal, vertical, horizontal curve, vertical curve) is designated, parameter fields where the parameters of the character pattern layout, including the X start point, Y start point, character height, etc., are entered and a character field in which a desired character (character string) is entered. All of the fields are blank since no data has been determined. The right area of the screen displays a plane of coordinate axes on which an image of the entered character pattern is displayed.

With the initial screen, the user enters a desired file name (for example "J123") in the file name field, designates a desired layout direction (for instance, horizontal) in the direction field. Then the user uses a pointing device such as a mouse or keyboard to specify the marking area MA of a desired size on the right area of display screen 13.

The control 38 determines the marking area MA from the command and position data entered by the pointed device and displays a graphical representation <<MA>> which generally represents the position, area, and domain of the marking are MA on the display screen (step G2). The graphical representation <<MA>> of the marking area may be formed by a figure indicating the outline of the marking area MA or the one which is filled in the internal of the marking area MA.

Then, the user may enter a desired character or character string ("ABCD") to be arranged in the marking area MA by a command from a keyboard. The control 38 identifies character codes of the entered characters and counts the number of characters (step G3).

The characters of the invention may include any hieroglyphic information assignable to a character code and/or font. Thus, it covers not only the characters in a narrow sense (e.g., a, 4) but also includes symbols (e.g., →, /), figures (e.g., ○, ▲), etc.

Next, the control 38 retrieves a reference font from the font memory for each individual entered character (step G4).

Next, the control 38 performs a layout process (step G5) in which unit character areas (C1, C2, C3, C4) for disposing the individual characters (A, B, C, D) of the input characters ("ABCD") and the spacing between characters are determined.

Figure 24:
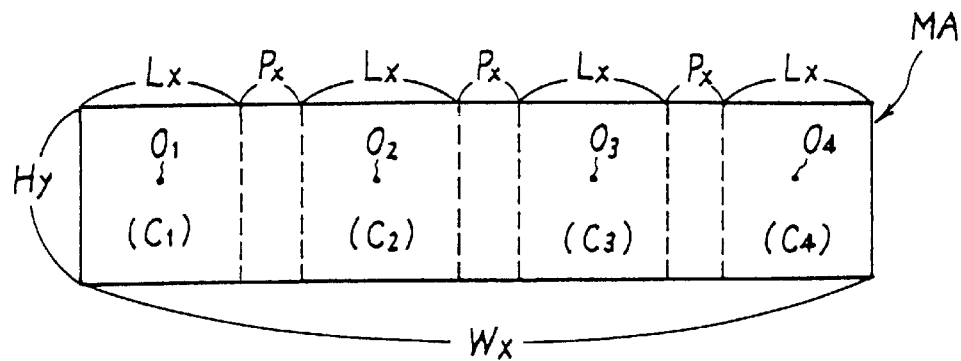
FIG. 24 illustrates unit character areas and character spacings arranged in a marking area in the character input mode of the embodiment.
Figure 25:
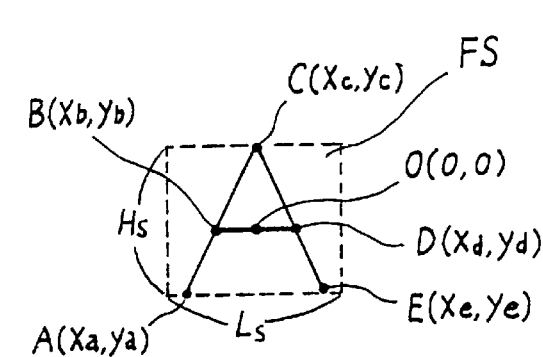
FIGS. 25(A) and 25(B) illustrate how a character pattern is determined from a reference font of an individual character in the character input mode in the embodiment.
Figure 25:
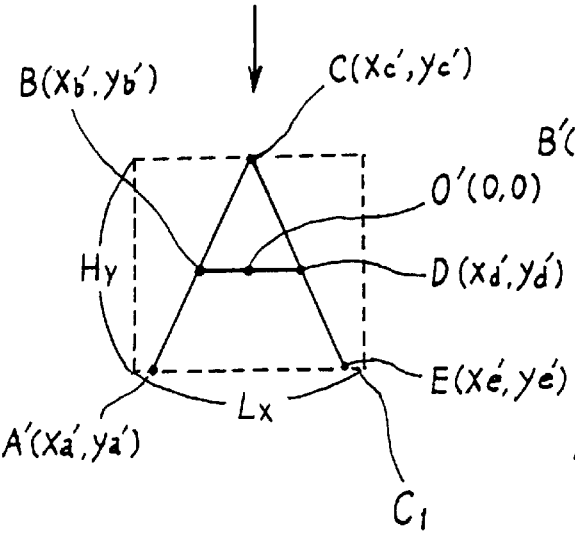
Figure 25:
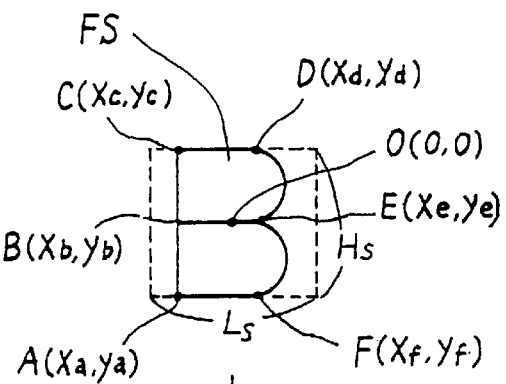
Figure 25:
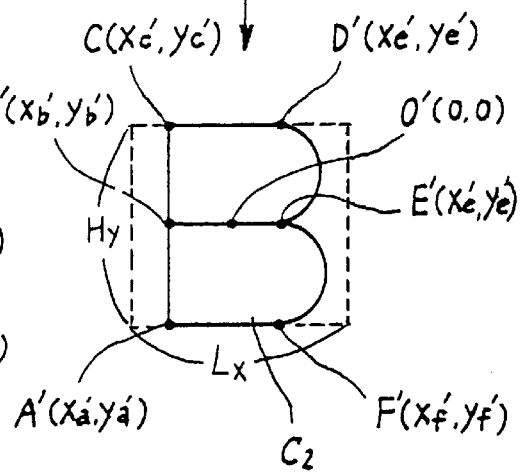

In the first layout process, as shown in FIG. 24, the control 38 determines a standard unit character area size ($L_x$, $H_y$) and a standard character-to-character space $P_x$ from the pattern length $W_x$ of the marking area MA and the number (4) of input characters ("ABCD"). The height Hy of the standard unit character area corresponds to the height (input value of the height) of the marking area MA. From the ratio (standard ratio) K of the standard character-to-character space $P_x$ to the standard unit character area width $L_x$ and the number input characters N, the $L_x$ and $P_x$ can be determined according to formulas (1) and (2) as follows:

$$N \times Lx + (N-1)Px = Wx \quad (1)$$

$$Px = K \times Lx \quad (0 < K < 1) \quad (2)$$

Next, the control 38 defines a pattern of each character (A, B, C, D) to be disposed in each unit character area (C1, C2, C3, C4) determined in the layout process (step G6).

To determine the character pattern, a reference font ("A", "B", etc.) of each character in the reference font area FS is transformed by a coordinate transformation that uses the ratio of the unit character area Ci size (Lx, Hy) to the reference font area FS size (Ls, Hs) and stored into respective unit character areas (C1, C2, C3, C4), as illustrated in FIGS. 25(A) and (B). In the example, a center of the area Fs, Ci is chosen as an origin of the coordinate. Points A (xa, ya), B(xb, yb) etc., of segments (vectors) forming each character reference font are transformed to the points A' (xa', ya'), B' (xb', yb') etc., by the ratio (Lx: Ls, Hy: Hs).

Figure 26:
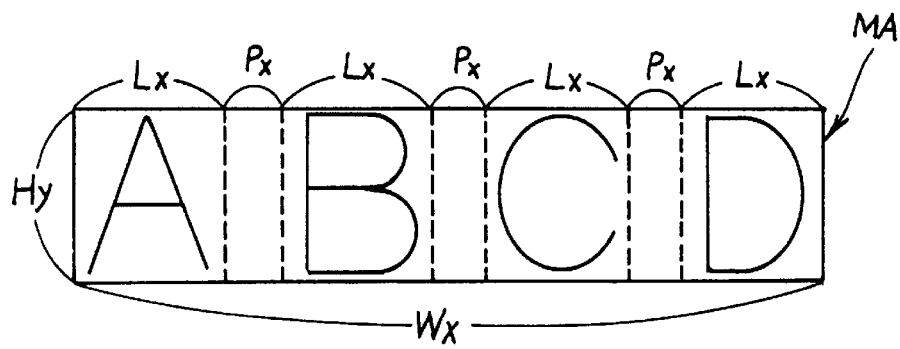
FIG. 26 illustrates an entire pattern of a character (character string) determined in the input character mode of the embodiment.

In this manner, each character pattern ("A", "B", "C", "D") is defined in each unit character area (C1, C2, C3, C4), as shown in FIG. 26. The character pattern data is constituted by vector data representative of segments (straight or curved line) of each character pattern. To determine the character pattern, parameter values of the character pattern, including X start point, Y start point, character pitch, etc., are specified. The character pitch refers to the distance between a center point $O_i$ of a unit character area Ci and a center point $O_{i+1}$ of the next unit character area $C_{i+1}$.

Figure 27:
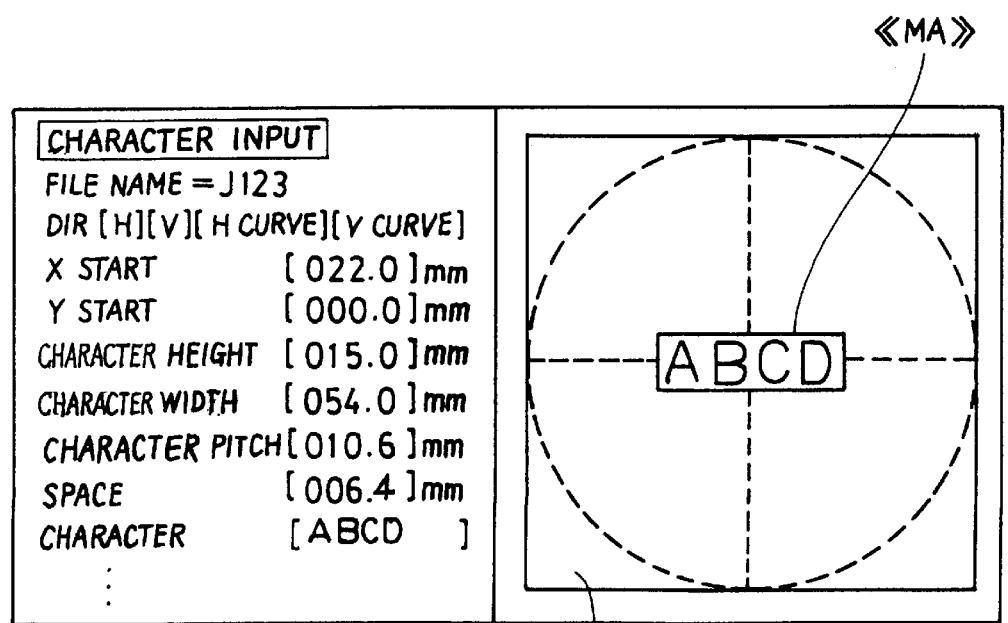
FIG. 27 is a view of a screen presenting a character pattern and parameters determined in the character input mode of the embodiment.

Next, the control 38 converts the generated character pattern ("A", "B", "C", "D") from vector form to bit-mapped image data ("ABCD") with the same layout and displays the resultant character pattern image ("ABCD") in superimposition on the graphical representation <<MA>> of the marking area on the display screen 13 (step G7), as shown in FIG. 27. The left area of the screen now displays parameter values determined in the character pattern determining process at respective parameter fields of X start point, Y start point, character height, etc. and also displays the contents (ABCD) of the entered characters.

If the contents and layout of the character pattern ("ABCD") presently defined and displayed on the screen are satisfactory, a user enters a register command (step G8). In response to the register command, the control 38 registers the presently defined and displayed character pattern ("ABCD") step G10. Specifically, the control 38 registers into memory the vector data (character pattern data) and the parameter values of the character pattern ("ABCD") for the present file (J123).

If the content or layout of the displayed character pattern ("ABCD") is not satisfactory, the user enters a command requesting a character pattern change, selects a parameter item from the screen and changes the parameter value (steps G8, G9). Then, the control 38 uses the changed parameter value to again perform the layout process (step G5) and character pattern determining process (step G6), thus newly determining the character pattern determining process (step G6), thus newly determining the character pattern ("ABCD").

Figure 28:
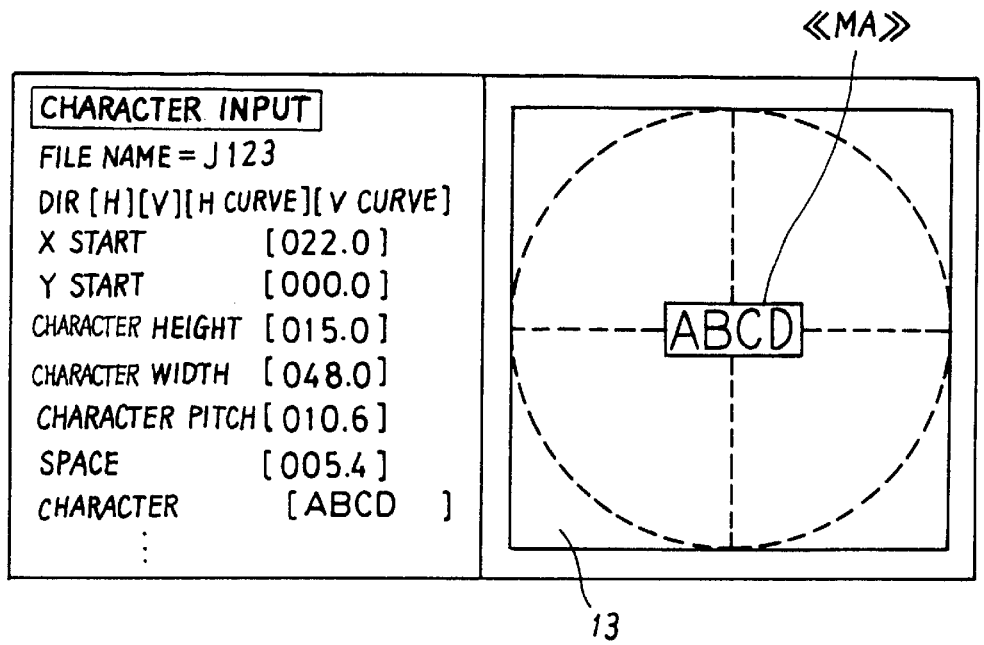
FIG. 28 is a view of a screen showing a modified character pattern by pattern width reduction together with parameter values in the character input mode of the embodiment.
Figure 29:
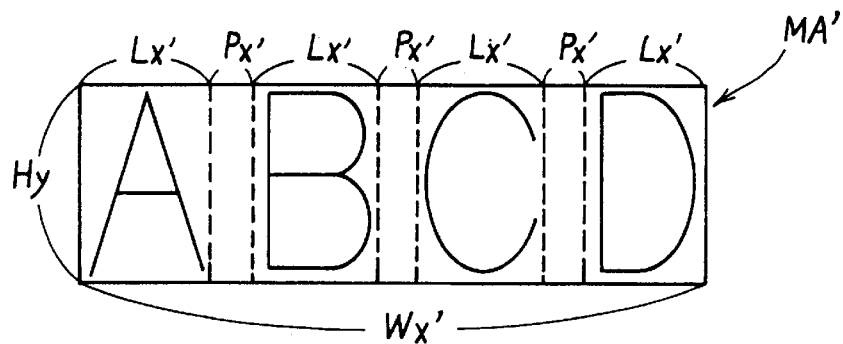
FIG. 29 illustrates a character pattern newly determined by pattern width reduction in the character input mode of the embodiment.

In FIG. 28, the user may change the pattern width from 054.0 mm to 048.0 mm, for instance. Since the pattern width corresponds to the width of the marking area MA, the marking area MA width has been reduced from Wx (54.0 mm) to Wx' (48.0 mm). Other parameter values (e.g. pattern height) are not changed. By performing the layout process (step G5) and character pattern determining process (step G6) again, a character pattern ("ABCD"), such as the one shown in FIG. 29, is newly determined.

On the display screen 13, the newly determined character pattern ("ABCD") is displayed in superposition on the graphical representation MA of the marking area (step G7). If the user enters an acknowledge command to the screen, the displayed character pattern ("ABCD") is registered (step G10).

Figure 30:
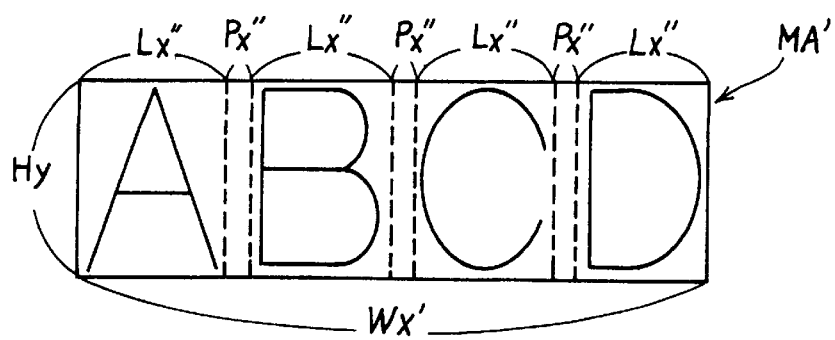
FIG. 30 illustrates a character pattern newly determined by the character-to-character space reduction from the pattern in FIG. 26 in the character input mode of the embodiment.

Even at this stage, the user may enter a change command to change or correct the character pattern ("ABCD") again. For example, for the character-to-character space change from 006.4 mm to 005.0 mm, a character pattern ("ABCD") with a layout shown in FIG. 30 is newly determined. In this case, the changed character-to-character space (x") and the pattern width (Wx') are used to determine the unit character width (Lx") of the unit character area.

As described, in accordance with the character input mode of the embodiment, a user uses a pointing means to specify a marking area with a desired size at a desired position on the display screen and enters a desired character (character string). Then, the control 38 runs software for the character pattern determining process, proportionally determines a unit character area and a character-to-character space from the entered number of characters in the marking area and generates a character pattern corresponding to an individual character reference font to be disposed in each unit character area. In this manner, the character pattern that is desired by the user is automatically defined and determined.

The present character input mode presents parameter values determined in the process of determining character pattern to the user via a display screen while allowing the user to change a value of any parameter or change a character pattern, thus providing a satisfactory man-machine interface. Therefore, without needing any high skill, a user can determine a desired character pattern in a short time through simple input operation.

The example of the character pattern ("ABCD") described so far is a relatively simple character string. This is illustrative only. The character input mode of the embodiment may be used to determine character patterns in various forms.

Figure 31A:
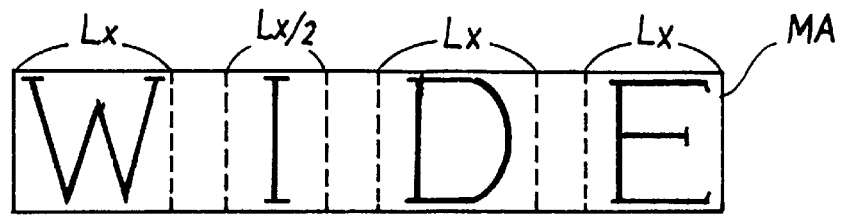
FIGS. 31(A)–31(D) illustrate other character patterns selectable in the character input mode of the embodiment.
Figure 31B:
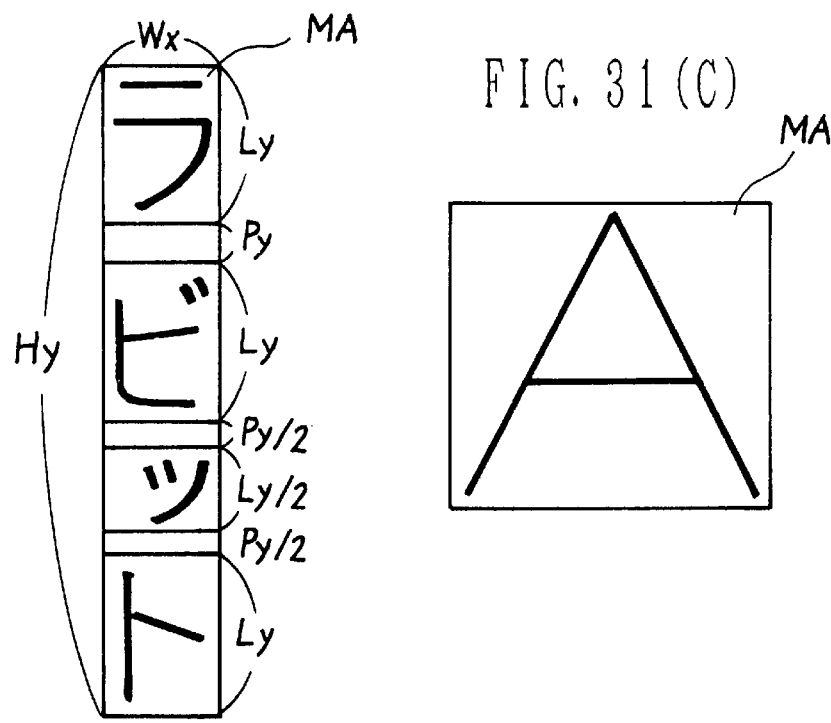
Figure 31C:
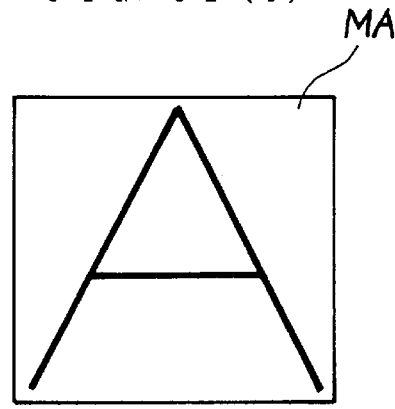
Figure 31D:
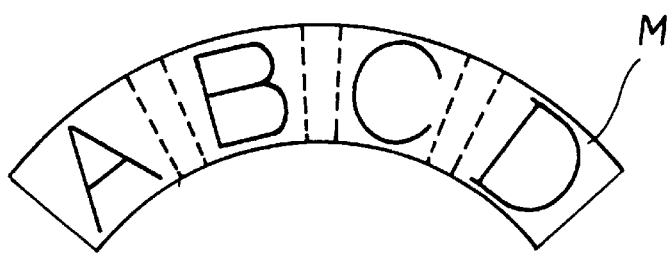

FIGS. 31(A)–(D) shows some other character patterns. In FIG. 31(A), the size (width) of a unit character string. In FIG. 31(B), the size (height) of a unit character area and the character-to-character space are determined depending on an individual character forming the character string. In FIG. 31(C), a single character is placed in the marking area MA. In FIG. 31(D), a horizontal curve is selected for the layout direction.

Figure 32:
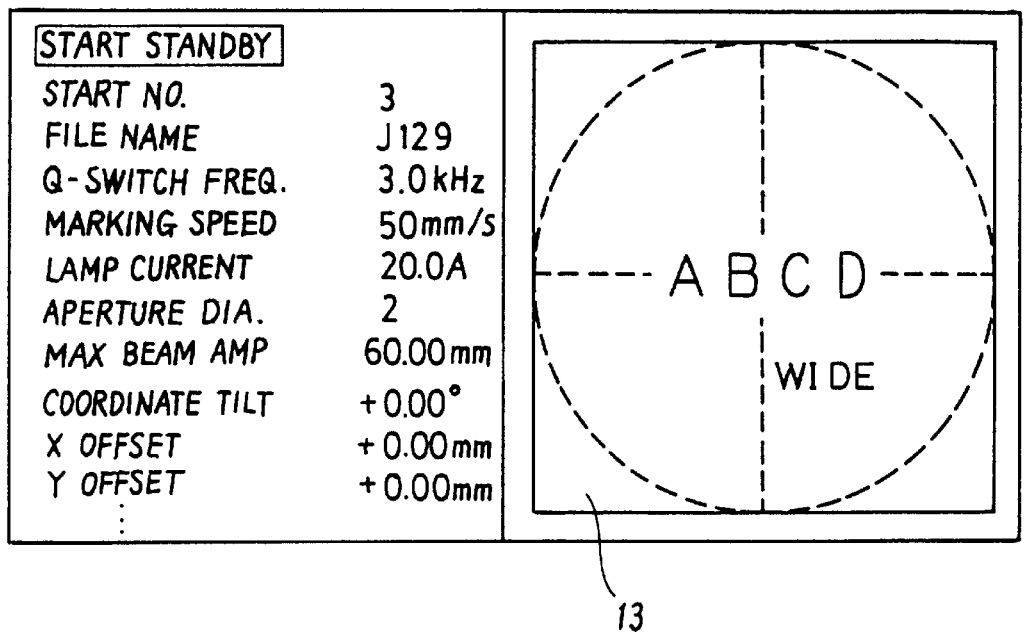
FIG. 32 is a view of a screen presenting a combination of plural character patterns selectable in the character input mode of the embodiment.

In FIG. 32, two character patterns ("ABCD") and ("WIDE") prepared in separate files and are combined as a new file (J129). In this case, in the marking operation of the start number (No. 3) the two character patterns ("ABCD") and ("WIDE") are simultaneously marked with a spacial relation as shown.

Two or more lines of characters or character strings may be arranged in a single marking area in accordance with the layout method described.

The configurations of the YAG laser marking apparatus of these embodiments, including the control power supply unit 10, the laser oscillator unit 12, the scanning head 20, etc. are merely illustrative. Any other suitable configuration may be employed.

In accordance with the character input mode of the embodiment, a user determines a marking area and enters a character or character string to be arranged in the area. Then, the apparatus automatically determines the character pattern from the entered marking area and the character or character string. Therefore, a desired character pattern can be set by a simple input operation in a short time.

The invention is not limited to the embodiment described and shown. Various other modifications can be made within the scope of the invention.

What is claimed is:

1. An apparatus for making a desired pattern of at least one of a character and figure on a surface of a workpiece by projecting a laser beam and scanning the surface, comprising:

marking area figure setting means for setting a marking area on a display screen;

character input means for inputting a desired character or character string to be arranged in said marking area;

character pattern determining means for determining a pattern of said desired character or character string from said character input means with a desired layout in said marking area set by said marking area figure setting means;

character pattern storing means for storing character pattern data indicative of said pattern of said desired character or character string determined by said character pattern determining means; and laser marking means for marking the surface using said character pattern data.

2. The apparatus of claim 1 wherein said marking area figure setting means comprises means for defining said marking area as a figure representative of an outline of said marking area.

3. The apparatus of claim 1 wherein said marking area figure setting means comprises means for defining said marking area as a figure which is filled within said marking area.

4. The apparatus of claim 1 wherein said character pattern determining means comprises:

layout setting means for setting unit character areas where individual characters, respectively, of said desired character string are to be placed within said marking area and spacing between adjacent unit character areas;

font storage means for storing data representative of reference fonts of said individual characters, respectively; and unit character pattern determining means for determining said patterns of said individual characters, respectively, of said desired character string in a corresponding unit character area from said reference fonts of said individual characters, respectively, from said font storage means and sizes of said unit character areas.

5. The apparatus of claim 4 wherein said layout setting means comprises means for determining said sizes of said unit character areas from a length of said marking area in a direction of said desired character string and the number of characters in said desired character string.

6. The apparatus of claim 5 wherein said layout setting means further comprises means for determining said sizes of said unit character areas from a height of said marking area.

7. The apparatus of claim 5 wherein said layout setting means further comprises means for determining said spacing between adjacent unit character areas from said length of said marking area in said direction of said desired character string and the number of characters in said desired character string.

8. The apparatus of claim 1 further comprising parameter output means for outputting values of predetermined parameters of said pattern of said desired character string from said character pattern determining means.

9. The apparatus of claim 1 further comprising parameter input means for inputting values of predetermined parameters and wherein said character pattern determining means comprises means for newly determining said pattern of said desired character string using a value of a parameter input by said parameter input means.

* * * * *